United States Patent [19]

Tazaki et al.

[11] Patent Number: 4,523,181
[45] Date of Patent: Jun. 11, 1985

[54] METHOD AND APPARATUS FOR PRODUCING A BINARY INFORMATION FOR AN INFORMATION TRANSMISSION

[75] Inventors: Saburo Tazaki, Matsuyama; Akifumi Ide, Kadoma, both of Japan

[73] Assignee: Matsushita Electric Industrial Co., Ltd., Kadoma, Japan

[21] Appl. No.: 437,460

[22] Filed: Oct. 28, 1982

Related U.S. Application Data

[63] Continuation of Ser. No. 202,436, Oct. 30, 1980, abandoned.

[30] Foreign Application Priority Data

Oct. 31, 1979 [JP] Japan ................................ 54-141761

[51] Int. Cl.³ ............................................. H03K 13/24
[52] U.S. Cl. ................................. 340/347 DD; 360/40
[58] Field of Search ................ 235/310; 340/347 DD; 375/19; 371/55, 56; 360/40

[56] References Cited

U.S. PATENT DOCUMENTS

| | | | |
|---|---|---|---|
| 3,587,088 | 6/1971 | Franaszer | 340/347 DD |
| 3,631,471 | 12/1971 | Griffiths | 340/347 DD |
| 3,753,113 | 8/1973 | Maruta | 375/19 |
| 3,772,680 | 11/1973 | Kawai | 340/347 DD |
| 3,913,093 | 10/1975 | De Vincentiis | 235/310 |

Primary Examiner—Charles D. Miller
Attorney, Agent, or Firm—Cushman, Darby & Cushman

[57] ABSTRACT

Method and apparatus for producing a binary information by a process comprising the steps of: dividing an input binary data sequence which has a predetermined bit cell length into blocks of a first data pattern thereby forming data blocks; converting information of said data blocks of a first data pattern into data blocks of a second data pattern; integrating accumulated charges of said converted data blocks of the second data pattern; and inverting data of a block of said second data pattern at least when said integrated amount is about to exceed a predetermined finite value in the case that an amount of accumulated charge in said second block is not zero, and producing a binary balanced output code from said second data pattern and said inverted data. By using inverted data pattern as necessary along with non-inverted data patterns it is possible to obtain a binary balanced coding wherein the minimum inversion interval is longer than a bit-cell length of the input information data and maximum inversion interval is short.

10 Claims, 11 Drawing Figures

METHOD AND APPARATUS FOR PRODUCING A BINARY INFORMATION FOR AN INFORMATION TRANSMISSION

This is a continuation of application Ser. No. 202,436, filed Oct. 30, 1980 now abandoned.

BACKGROUND OF THE INVENTION

1. Field of the Invention

This invention relates to an improvement of method and apparatus for producing a binary information for an information transmission.

2. Description of the Prior Art

Concerning the transmission of informations through transmission lines, various coding schemes by which those transmission lines were usable with high efficiencies and also with as less deterioration of informations as possible have been devised and used so far.

As is well known in the art, a certain preferable scheme is chosen among such various coding schemes in dependence upon the types of information sources and the characteristics of the transmission lines, so as to avoid mismatching between the information sources and the transmission lines. From the above point of view, the coding scheme can be regarded as interfaces between the information sources and the transmission lines, and hence, in the information transmission apparatuses they are one of very important factors which determine their performance.

The general information transmission process is shown in a schematic block diagram of FIG. 1.

In FIG. 1, 1 is an information source, 2 is an encoder, 3 is a transmission line, 4 is a decoder, and 5 is an information receiving end. When an information generated in the information source 1 is transmitted through the transmission line 3 to the information receiving end, first of all, the information is applied to the encoder 2 and transformed thereby, then it is applied to the transmission line 3. The information passed through the transmission line 3 is inversely transformed to the original pattern by the decoder 4 and thus it reaches the information receiving end 5. As has been pointed out, it is often the case that the information source 1 and the transmission line 3 mismatches. For example, it might happen such that the occupied frequency band width of an information sent out from the information source 1 differs from the pass-band of the transmission line 3. Then for accomplishing an accurate information transmission within the pass-band of the transmission line 3, the information from the information source 1 is to be transformed by the encorder 2.

The prior arts of the coding schemes are shown in FIG. 2 with using corresponding waveform diagrams. In FIG. 2, 6 is a data sequence, 7, 8, 9, 10 and 11 show various coded waveforms of said data sequence 6 obtained through different coding schemes, NRZ, NRZI, FM, PE, and MFM, respectively. Here, u indicates the time length of one bit-cell, that is, the bit-cell length.

As is well known, the NRZ(7) is a coding scheme wherein only when the data (6) is "1" (corresponding to "high"), the output is kept to high level during its bit cell period, while NRZI(8) is a coding scheme wherein only when the data 6 is "1" the output level is inverted. Meanwhile, in the case of FM(9), when the data (6) is "0" the output level is inverted only at the boundary of its bit-cell and when the data (6) is "1" the output level is inverted at the center as well as at the boundary bit-cell. In the case of PE (10), when the data (6) is "1" the output level rises up at the center of its bit-cell, and when the data (6) is "0" the output level falls down at the center of its bit-cell. The inversion of the output at the bit cell boundary in this scheme taken place in dependence upon the relative sequence of the data (6). In the case of MFM (11), when the data (6) is "1" the output level is inverted at the center of its bit-cell, and when the data (6) is kept "0" over successive bit-cells, the output level is inverted at the beginning of the bit-cell. These coding schemes mentioned above are only several examples among the schemes hitherto used. Here, in either case of those coding schemes shown in FIG. 2, for every bit of the input data, one unit of predetermined output waveform is given.

In contrast to the abovementioned coding schemes, many different coding schemes have been devised and used in practice, wherein the input data sequence is divided into blocks at every prescribed number of bits and the encoding is processed by converting those data blocks into different data blocks in accordance with data pattern contained in each data block. As those coding schemes, the 4–5 conversion, the 8–9 conversion, and 8–10 conversion which are seen in the IBA coding may be mentioned. These are called by general terms such as "block coding" or "GCR". In either case, the input data sequence is divided into blocks, and resulted data patterns contained in the blocks are converted new data patterns corresponding to its original data patterns in a prescribed manner.

Then, as an example of the block coding, case of the 8–10 conversion is shown in FIG. 3.

In FIG. 3, (13) is a clock signal corresponding to an input data sequence applied to the encoder. Hereinafter the clock signal is represented by a row of upward-directing arrows as in FIG. 3. Every arrow represents the time at which the clock signal rises up or falls down to define the clock time. (14) is an input data sequence, (15) is a clock signal corresponding to an output data sequence produced from the encoder, (16) is an output data sequence, v is a bit-cell period of the input data, v' is a bit-cell period of the converted output data, w is an input data block, w' is a converted output data block, $a_{n0}$ to $a_{n7}$ are data extending over 8 bit-cells, in which suffix n represents an n-th data block in the input data sequence, and $b_{n0}$ to $b_{n9}$ are data extending over 10 bit-cells and constitute an n-th data block in the converted output data sequence. As is clear also from FIG. 3, the number of possible data patterns in the input data block is 256 ($2^8$), and on the other hand, there exists exactly 1024 ($2^{10}$) different data patterns in the data output block. That is, the number of data patterns in the output data block exists four ($2^2$) times as much as the number of possible data patterns in the input data block, then there is a freedom of selecting 256 different data patterns out of 1024 usable patterns as the output data block, depending upon a desired way of setting the character of the converted data patterns.

Also, as has been pointed out, an adequate coding scheme must be selected in dependence on the characteristics of transmission line utilized. In usual cases, the transmission lines have a band-limited characteristic. Hereupon, the word of transmission line in this invention is used not only in a sense of ordinary means but also in a sense including apparatuses, to and from which the coded signal is fed and taken out. For example, a magnetic recording and reproducing system might be mentioned as the transmission line used in the above broad sense.

Therefore, in this specification, the explanation is given by taking an example in which a magnetic recording and reproducing system is considered as the transmission line.

The magnetic recording and reproducing system has normally the band-limited characteristic due to those factors such as the characteristics of transducers for transforming magnetic signals into electric signals, and vice versa or various existing losses. Therefore, for the magnetic recording and reproducing, an ideal coding scheme is such that through which signal can be converted into a signal containing neither dc nor extremely low frequency components and having a frequency spectrum concentrating inside the signal pass-band. In more concrete description, an ideal coding scheme is such that through which signal's minimum interval of the magnetizing inversion is long and its maximum interval of the magnetizing inversion is short and also its dc component is eliminated after the conversion. If other type of recording or transmission than the magnetic one, the abovementioned "magnetizing inversion" should read "electric inversion".

In the above explanation, expressions such as "containing no dc component" or "dc component is eliminated" has been used. Hereupon, it will be necessary to clarify the meaning of the above expressions. It is as follows: When a certain signal is expressed by, g(t), a function of time, the meaning of the expression "containing no dc component" is g(t) is a function of upper bounded type in integrated form". That is, it means a signal expressed by g(t) satisfying the following equation:

$$|\int g(t)dt| \leq Y, \qquad (101)$$

where Y is an arbitrary constant. Using still another expression, those having characteristics expressible by Eq. (101) can be called as "balanced code scheme".

Then, in the following explanation, instead of the expression "containing no dc component", the term "balanced code" will be used and furthermore, since only binary signals are treated in this invention, particularly a term "binary balanced code" will be used.

As is clear from the above explanation, upon evaluating various coding schemes, the maximum and minimum values of the interval of the magnetizing inversion and whether it is a balanced code or not are most important factors. Then, about each coding scheme shown in FIG. 2 and FIG. 3, evaluated results on the above three points are listed in TABLE 1.

TABLE 1

| coding scheme | maximum interval of magnetizing inversion | minimum interval of magnetizing inversion | balanced code or not |
| --- | --- | --- | --- |
| NRZ | infinity | 1 | no |
| NRZI | infinity | 1 | no |
| FM | 1 | ½ | yes |
| PE | 1 | ½ | yes |
| MFM | 2 | 1 | no |
| 3 PM | 6 | 3/2 | no |
| IBA 8-10 conversion | 8 | 4/5 | yes |

In TABLE 1, as an example of the block coding, the "IBA 8-10 conversion" is shown. Also in this table, the maximum and minimum interval of the magnetizing inversion are tabulated with those values normalized by the bit-cell period of the input data.

As is clear from TABLE 1, FIG. 2 and FIG. 3, in NRZ or NRZI, although the minimum interval of the inversion (hereinafter denoted as Tmin) takes a comparatively large value, that is, 1, the maximum interval of the inversion (hereinafter denoted as Tmax) becomes infinity, and accordingly neither of them is a binary balanced code. In FM and PE, although they are binary balanced codes, Tmin is as very small as ½. In MFM, Tmin is 1 and Tmax is 2 and hence they are close in their values to each other, however, it is not a binary balanced code. Also in 3 PM, Tmin and Tmax take separated values as 3/2 and 6, respectively, and even more it is not a binary balanced code. Meanwhile, in the case of IBA 8-10 conversion, since it is devised in a manner that dc component is not included upon the conversion of data block, it is naturally a binary balanced code, however Tmin is 4/5, being less than 1, while Tmax is 8, which is a considerably large value.

In TABLE 1, only several examples of coding schemes were shown. For the evaluation of these coding schemes for the magnetic recording and reproducing system, the same requirements are proposed as mentioned before, that is, Tmin should be as large as possible from the viewpoint of recording density and also Tmax should be as small as possible from the viewpoint of self-locking. Also, since, in ordinary magnetic recording with rotating heads, and reproducing systems, the dc component cannot be transmitted, the binary balanced code is quite effective for such the magnetic recording and reproducing system. However, in the conventional binary balanced codes proposed so far, such as in FM, PE, IBA 8-10 conversion, or ZM, Tmin in either of them is 1 or less than 1.

As described already, from the requirement of raising the reproducibility of clock signal at the receiving side, and also from the requirement of reducing the low-frequency component after the conversion, the maximum interval of the inversion Tmax should be as small as possible. Meanwhile, from the requirement of reducing the high-frequency component after conversion, the minimum interval of the inversion Tmin should be as large as possible. Furthermore, in the usual transmission lines, it is often the case that the dc component cannot be sent through them, particularly in the magnetic recording and reproducing systems wherein the transmission lines are regarded as magnetic tape-recording head systems, any coding scheme not including dc component is strongly desired.

SUMMARY OF THE INVENTION

Considering those drawbacks of the conventional coding schemes described in the preceding section, the first purpose of the present invention is to provide a new coding scheme and its accompanying apparatus with which, in case of transmitting binary informations, any information degradation taking place in the transmission lines can be reduced under the condition due to characteristics of those given transmission lines. Furthermore, the second purpose of the present invention is to provide a new coding scheme and its accompanying apparatus in which any dc component is completely eliminated, that is its code is a binary balanced one and the maximum interval of the inversion Tmax is small and the minimum interval of the inversion Tmin is large. Such the coded signal can be sent easily through various transmission lines.

For accomplishing the abovementioned purposes, in the present invention, the data sequence of binary information to be sent is divided into blocks at every prescribed number of bit-cells, and data pattern included in each block is converted into new data pattern in a prescribed manner corresponding to the original data pattern. According to the invention it becomes possible to select the data patterns constituting a binary balanced code after conversion and to make Tmin comparatively large, for instance, larger than 1 as well as Tmax comparatively small, and desired coding scheme and its accompanying apparatus satisfying the abovementioned purposes can be realized.

BRIEF EXPLANATION OF THE DRAWINGS

Brief explanation for the attached drawings is given below.

DESCRIPTION OF PREFERRED EMBODIMENT

Figure 1:
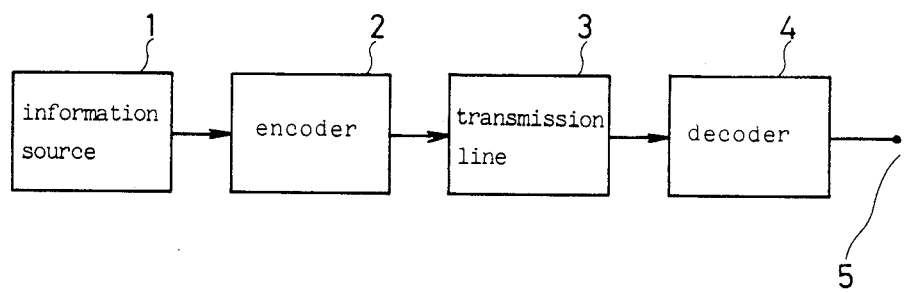
FIG. 1 is a schematic block diagram showing the information transmission processes.
Figure 2:
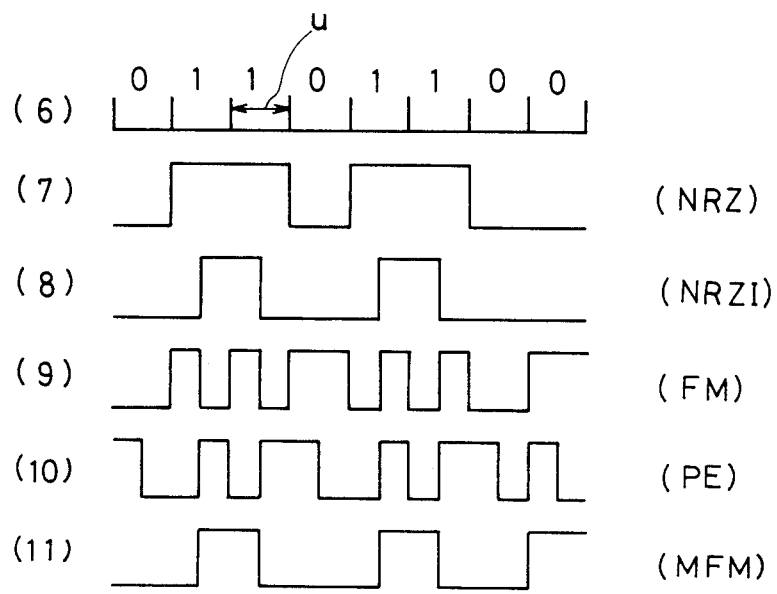
FIG. 2 is a waveform showing conventional examples concerning the coding schemes of binary informations.

The method of producing a binary information in accordance with the present invention comprises the steps of:

dividing input binary data sequence which has a predetermined bit-cell length into blocks of a first data pattern thereby forming data blocks, converting information of said data blocks of a first data pattern into data blocks of a second data pattern, integrating accumulated charges of said converted data blocks of the second data pattern, inverting data of a blocks of said second data pattern at least when said integrated amount is about to exceed a predetermined finite value in the case that an amount of accumulated charge in said block is not zero, and producing a coded output of a binary balanced code from both of said second data pattern and said inverted data.

The apparatus of producing a binary information in accordance with the present invention comprises:

a data divider for dividing input binary data sequence into blocks of a first data pattern, an address data generator which generates address signal by receiving output signal of said data divider, a memory which generates converted data and accumulated charge data, a modifier which modifies said converted data and said accumulated charge data with a predetermined manner, an integrator which integrate said accumulated charge data, a controller which produces a control signal to control operation of said modifier, said control signal being produced from output signal of said integrator and said accumulated charge data, a parallel serial converter which converts said converted data at a parallel output from said modifier into a serial output signal.

1. Principle

The operation principle of a coding scheme proposed in the present invention is explained below.

In the coding scheme of the present invention, as has been explained, an input data sequence is divided into blocks at every prescribed number of data bits, thereby input data blocks are obtained, and these input data blocks are converted into output data blocks having prescribed data patterns depending on data patterns of those input data blocks. In this respect, this coding scheme is regarded as one of so-called block-coding. Hereupon, in the present invention, for setting the data pattern in the output data block, first a minimum interval of the inversion Tmin and a maximum interval of the inversion Tmax are fixed to predetermined values, then the data pattern in the output data block is set in a manner that the data level inversion takes place only in a predetermined time interval range between Tmin and Tmax, and also that the data patterns become a binary balanced code as the result of the conversion.

As an example, the input data sequence is assumed to be divided into blocks at every 8 bit-cells, thereby the input data blocks are set. Then it is also assumed that the output data block comprises 20 data bit-cells. For the setting of the data pattern of the output data block, detailed explanation will be given later.

Sizes of the interval of the inversion and possible numbers of data patterns available by possible combination of those level inversion are all tabulated in TABLE 2.

TABLE 2

Number of Frequencies on Interval Usage, Number of Inversion Occurrences and Number of Possible Patterns

| pattern group | interval of the inversion | | | | | | number of inversion occurrences | number of possible patterns |
|---|---|---|---|---|---|---|---|---|
| | number of frequencies on interval usage | | | | | | | |
| | 10 | 9 | 8 | 7 | 6 | 5 4 3 | | |
| No. 1 | 2 | 0 | 0 | 0 | 0 | 0 0 0 | 2 | 1 |
| No. 2 | 1 | 0 | 0 | 1 | 0 | 0 0 1 | 3 | 6 |
| No. 3 | 1 | 0 | 0 | 0 | 1 | 0 1 0 | 3 | 6 |
| No. 4 | 1 | 0 | 0 | 0 | 0 | 2 0 0 | 3 | 3 |
| No. 5 | 1 | 0 | 0 | 0 | 0 | 0 1 2 | 4 | 12 |
| No. 6 | 0 | 1 | 1 | 0 | 0 | 0 0 1 | 3 | 6 |
| No. 7 | 0 | 1 | 0 | 1 | 0 | 0 1 0 | 3 | 6 |
| No. 8 | 0 | 1 | 0 | 0 | 1 | 1 0 0 | 3 | 6 |
| No. 9 | 0 | 1 | 0 | 0 | 0 | 1 0 2 | 4 | 12 |
| No. 10 | 0 | 1 | 0 | 0 | 0 | 0 2 1 | 4 | 12 |
| No. 11 | 0 | 0 | 2 | 0 | 0 | 0 1 0 | 3 | 3 |
| No. 12 | 0 | 0 | 1 | 1 | 0 | 1 0 0 | 3 | 6 |
| No. 13 | 0 | 0 | 1 | 0 | 2 | 0 0 0 | 3 | 3 |
| No. 14 | 0 | 0 | 1 | 0 | 1 | 0 0 2 | 4 | 12 |
| No. 15 | 0 | 0 | 1 | 0 | 0 | 1 1 1 | 4 | 24 |
| No. 16 | 0 | 0 | 1 | 0 | 0 | 0 3 0 | 4 | 4 |
| No. 17 | 0 | 0 | 1 | 0 | 0 | 0 0 4 | 5 | 5 |
| No. 18 | 0 | 0 | 0 | 2 | 1 | 0 0 0 | 3 | 3 |
| No. 19 | 0 | 0 | 0 | 2 | 0 | 0 0 2 | 4 | 6 |
| No. 20 | 0 | 0 | 0 | 1 | 1 | 0 1 1 | 4 | 24 |
| No. 21 | 0 | 0 | 0 | 1 | 0 | 2 0 1 | 4 | 12 |
| No. 22 | 0 | 0 | 0 | 1 | 0 | 1 2 0 | 4 | 12 |
| No. 23 | 0 | 0 | 0 | 1 | 0 | 0 1 3 | 5 | 20 |
| No. 24 | 0 | 0 | 0 | 0 | 2 | 1 0 1 | 4 | 12 |
| No. 25 | 0 | 0 | 0 | 0 | 2 | 0 2 0 | 4 | 6 |
| No. 26 | 0 | 0 | 0 | 0 | 1 | 2 1 0 | 4 | 12 |

TABLE 2-continued

Number of Frequencies on Interval Usage, Number of Inversion Occurrences and Number of Possible Patterns

| pattern group | number of frequencies on interval usage | | | | | | | number of inversion occurrences | number of possible patterns |
|---|---|---|---|---|---|---|---|---|---|
| | 10 | 9 | 8 | 7 | 6 | 5 | 4 3 | | |
| No. 27 | 0 | 0 | 0 | 0 | 1 | 1 | 0 3 | 5 | 20 |
| No. 28 | 0 | 0 | 0 | 0 | 1 | 0 | 2 2 | 5 | 30 |
| No. 29 | 0 | 0 | 0 | 0 | 0 | 4 | 0 0 | 4 | 1 |
| No. 30 | 0 | 0 | 0 | 0 | 0 | 2 | 1 2 | 5 | 30 |
| No. 31 | 0 | 0 | 0 | 0 | 0 | 1 | 3 1 | 5 | 20 |
| No. 32 | 0 | 0 | 0 | 0 | 0 | 1 | 0 5 | 6 | 6 |
| No. 33 | 0 | 0 | 0 | 0 | 0 | 0 | 5 0 | 5 | 1 |
| No. 34 | 0 | 0 | 0 | 0 | 0 | 0 | 2 4 | 6 | 15 |
| | | | | | | | grand total | | 357 |

In TABLE 2, interval of magnetizing inversion is represented by values normalized by bit-cell length of the output data, therefore, it is 20/8 times of that normalized by bit-cell length of the input data. Also in TABLE 2, the minimum interval of magnetizing inversion and the maximum interval of the inversion are assumed to be 3 and 10, respectively.

In TABLE 2, the data patterns whose the magnetizing inversion intervals are between 3 and 10 are tabulated. Naturally, the sum of the inversion intervals included one output block becomes always 20.0. These data patterns are grouped to 34 different groups, pattern group No. 1 to pattern group No. 34, depending upon the way of combination of the inversion intervals. Since in each pattern group, still further data patterns may exist in dependence upon the permutation of those combination of the inversion intervals, all the possible data patterns are much more than 34. Hereupon, TABLE 2, "Number of Frequencies" represents the number of intrinsic inversion interval of each pattern group in assumption that the inversion is took place necessarily at the end of each pattern, and "number of possible patterns" represents the total number of possible patterns belonging to each pattern group.

Now, further explanations is given with using an example. For example, the pattern group No. 1 is a group of those data patterns using a magnetizing inversion having an inversion interval of 10 twice, and in this case, two times of each interval of 10 becomes 20, which equals one block length of 20. Also, since in this case a magnetizing inversion whose interval is a half of one block length is used two times, any permutative exchange in this combination of the inversion yields no new pattern. Therefore, the number of possible patterns in this case becomes only one. Hereupon, in TABLE 2, every pattern was assumed to start with the high level.

Figure 4:
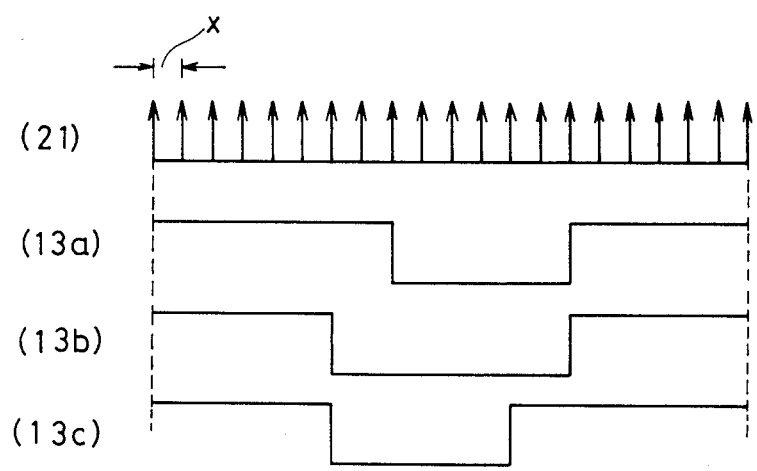
FIG. 4 to FIG. 6 are waveforms of data patterns used in embodiments of the present invention.

For giving still further explanation, several waveforms are shown in FIG. 4. FIGS. 4 shows waveforms belonging to the pattern group No. 13. From TABLE 2, in the pattern group No. 13, data patterns consist of a combination of three different intrinsic elementary patterns of which the inversion intervals are 8, 6 and 6, respectively, then it is clear that there exist three different patterns depending upon their permutation. Waveforms (13a), (13b) and (13c) in FIG. 4 are thus the data patterns which belong to the pattern group No. 13: In TABLE 2 and FIG. 4, as has been mentioned before, only the data patterns whose patterns start with the high level are shown. Hereupon, (21) is a clock signal corresponding to the output data and X indicates the bit-cell period. In either data pattern of (13a), (13b) and (13c) shown in FIG. 4, their number of the inversion is 3. Hereupon, for reference, the grand total of the number of possible patterns shown in TABLE 2 becomes 357. Since, in TABLE 2, only those data patterns starting with the high level are tabulated, the grand total number of usable patterns including patterns starting with the low level becomes two times of 357, that is, 714.

In making TABLE 2, only the limitation on the interval of the magnetizing inversion was taken into account, that is, the existence or non-existence of dc component was out of consideration. That is, any condition for obtaining a binary balanced code was not applied at all.

Now consideration including obtaining the binary balanced code must be added to TABLE 2. Those data patterns satisfying Eq. (101) are binary balanced codes, and use of them eliminates any dc component from the signal after conversion. First, as a detecting means for detecting which data pattern in TABLE 2 should be employed for realizing a binary balanced code, accumulated charge (to be defined below) for each data pattern must be calculated. Naturally, employment of only those data patterns whose accumulated charges are zero can realize the binary balanced codes. Or even in case that data patterns having non-zero accumulated charge are included, an insertion of data patterns having an amount of charge which cancels out the said amount of charge can also realize the binary balanced codes.

Hereupon, the accumulated charge is defined as an integrated value of level height in each data pattern of an output data block over one block length, when the level height of the high level in a data pattern of an output data block is taken at $+I$ and that of the low level is taken as $-I$. More specifically, if a bit-cell period of output data block is $T_{20}$ and a data pattern is, assuming a function of time, $f_p(t)$, then the accumulated charge can be expressed as $$C_p = \int_0^{20 \cdot T} f_p(t)dt. \tag{102}$$

Here, $f_p(t)$ is given in accordance with the data pattern, and in case of (13a), it can be expressed as $$\begin{cases} f_{13a}(t) = +I; & \begin{pmatrix} 0 \leq t \leq 8 \cdot T_{20} \\ \text{and} \\ 14 \cdot T_{20} \leq 20 \cdot T_{20}, \end{pmatrix} \\ f_{13a}(t) = -I; & 8 \cdot T_{20} \leq t \leq 14 \cdot T_{20}. \end{cases} \tag{103}$$

Therefore, the accumulated charge $C_p$ for the data pattern 13a becomes $$C_{13a} = 8 \cdot I \cdot T_{20} \tag{104}$$

by using Eq. (102) and Eq. (103). Hereupon a subscript p used as $f_p(t)$ and $C_p$ means that the data pattern in question is p. As has been explained above, when the absolute values of the each accumulated charge of employed data patterns is integrated or integrally added and the absolute value of the total of accumulated charges of each data pattern obtained after integration of the accumulated charges is less than a prescribed value, this data pattern can be regarded as a binary balanced code as is clear also from Eq. (101).

That is, since it is necessary to integrate the accumulated charge of each data pattern for detecting which data pattern should be employed in order to realize the binary balanced code, the amount of accumulated charge of those data patterns grouped in each data pattern group shown in TABLE 2 are calculated, and the numbers of data patterns having those amounts of charge are tabulated in TABLE 3.

Considering Condition 1, first data patterns are limited to those of pattern groups having only interval of the inversion under 9 in one pattern block. Then the interval of the inversion in one block is naturally less than 9. Next, successive sequence of two blocks is considered. Even if no inversion is permitted to be present at the connecting point of those successive data blocks, for the total sequence of these data blocks, the interval

TABLE 3

| pattern group | Number of Data Patterns amount of accumulated charge | | | | | | | | | | | |
|---|---|---|---|---|---|---|---|---|---|---|---|---|
| | −8 | −6 | −4 | −2 | 0 | 2 | 4 | 6 | 8 | 10 | 12 | 14 |
| No. 1 | 0 | 0 | 0 | 0 | 1 | 0 | 0 | 0 | 0 | 0 | 0 | 0 |
| No. 2 | 0 | 0 | 0 | 0 | 2 | 0 | 0 | 2 | 0 | 0 | 0 | 2 |
| No. 3 | 0 | 0 | 0 | 0 | 2 | 0 | 0 | 0 | 2 | 0 | 2 | 0 |
| No. 4 | 0 | 0 | 0 | 0 | 1 | 0 | 0 | 0 | 0 | 2 | 0 | 0 |
| No. 5 | 2 | 4 | 0 | 0 | 0 | 0 | 0 | 4 | 2 | 0 | 0 | 0 |
| No. 6 | 0 | 0 | 0 | 0 | 0 | 2 | 2 | 0 | 0 | 0 | 0 | 0 |
| No. 7 | 0 | 0 | 0 | 0 | 0 | 2 | 0 | 2 | 0 | 0 | 2 | 0 |
| No. 8 | 0 | 0 | 0 | 0 | 0 | 2 | 0 | 0 | 2 | 2 | 0 | 0 |
| No. 9 | 2 | 0 | 4 | 0 | 0 | 0 | 4 | 0 | 2 | 0 | 0 | 0 |
| No. 10 | 0 | 4 | 2 | 0 | 0 | 0 | 2 | 4 | 0 | 0 | 0 | 0 |
| No. 11 | 0 | 0 | 0 | 0 | 0 | 0 | 2 | 0 | 0 | 0 | 1 | 0 |
| No. 12 | 0 | 0 | 0 | 0 | 0 | 0 | 2 | 2 | 0 | 2 | 0 | 0 |
| No. 13 | 0 | 0 | 0 | 0 | 0 | 0 | 1 | 0 | 2 | 0 | 0 | 0 |
| No. 14 | 2 | 0 | 0 | 4 | 0 | 4 | 0 | 0 | 2 | 0 | 0 | 0 |
| No. 15 | 0 | 4 | 4 | 4 | 0 | 4 | 4 | 4 | 0 | 0 | 0 | 0 |
| No. 16 | 0 | 0 | 2 | 0 | 0 | 0 | 2 | 0 | 0 | 0 | 0 | 0 |
| No. 17 | 0 | 0 | 0 | 2 | 0 | 0 | 0 | 0 | 3 | 0 | 0 | 0 |
| No. 18 | 0 | 0 | 0 | 0 | 0 | 0 | 0 | 2 | 1 | 0 | 0 | 0 |
| No. 19 | 1 | 0 | 0 | 0 | 4 | 0 | 0 | 0 | 1 | 0 | 0 | 0 |
| No. 20 | 0 | 4 | 0 | 4 | 8 | 4 | 0 | 4 | 0 | 0 | 0 | 0 |
| No. 21 | 0 | 0 | 4 | 0 | 4 | 0 | 4 | 0 | 0 | 0 | 0 | 0 |
| No. 22 | 0 | 0 | 2 | 4 | 0 | 4 | 2 | 0 | 0 | 0 | 0 | 0 |
| No. 23 | 0 | 0 | 0 | 2 | 6 | 0 | 0 | 6 | 6 | 0 | 0 | 0 |
| No. 24 | 0 | 0 | 2 | 4 | 0 | 4 | 2 | 0 | 0 | 0 | 0 | 0 |
| No. 25 | 0 | 0 | 1 | 0 | 4 | 0 | 1 | 0 | 0 | 0 | 0 | 0 |
| No. 26 | 0 | 0 | 0 | 4 | 4 | 4 | 0 | 0 | 0 | 0 | 0 | 0 |
| No. 27 | 0 | 0 | 0 | 2 | 0 | 6 | 6 | 0 | 6 | 0 | 0 | 0 |
| No. 28 | 0 | 0 | 0 | 0 | 6 | 6 | 3 | 12 | 3 | 0 | 0 | 0 |
| No. 29 | 0 | 0 | 0 | 0 | 1 | 0 | 0 | 0 | 0 | 0 | 0 | 0 |
| No. 30 | 0 | 0 | 0 | 0 | 3 | 6 | 12 | 6 | 3 | 0 | 0 | 0 |
| No. 31 | 0 | 0 | 0 | 0 | 0 | 6 | 8 | 6 | 0 | 0 | 0 | 0 |
| No. 32 | 0 | 0 | 0 | 3 | 0 | 3 | 0 | 0 | 0 | 0 | 0 | 0 |
| No. 33 | 0 | 0 | 0 | 0 | 0 | 0 | 1 | 0 | 0 | 0 | 0 | 0 |
| No. 34 | 0 | 0 | 0 | 3 | 9 | 3 | 0 | 0 | 0 | 0 | 0 | 0 |

In TABLE 3, the amounts of accumulated charges are expressed as values normalized by $I \cdot T_{20}$. For example, in case of the data pattern group No. 13, using Eq. (102) and referring to TABLE 2 and FIG. 4, for the data pattern 13a, $C_{13a}=8$, for the data pattern 13b, $C_{13b}=4$, and for the data pattern 13c, $C_{13c}=8$, respectively, are calculated, then in this case it is found that one data pattern with an amount of accumulated charge of 4 exists and two data patterns with an amount of accumulated charge of 8 exist. In this manner, all the data pattern groups are examined and the result obtained is shown in TABLE 3.

Next, the selection of usable data patterns from all of the possible data pattern must be done. Prior to do that, as a criterion, let us consider a coding scheme which satisfies the following three conditions at one time as one embodiment:

Condition 1.  Tmax = 18
(value normalized by $I \cdot T_{20}$)
Condition 2.  Tmin = 3
(value normalized by $I \cdot T_{20}$)
Condition 3.  Binary balanced code (Case 1)

It is needless to mention that any coding scheme which satisfies all the above three conditions at one time has not been proposed so far.

of the inversion never exceeds 18.

Next, for Condition 2, as is clear from TABLE 2, in all the data pattern group No. 1 through No. 34, the interval of the inversion are selected so as not to be less than 3.

As for Condition 3, for the convenience of explanation, it will be described later.

Thus, from all 34 different pattern groups in TABLE 3, only those groups satisfying both conditions 1 and 2, which are those groups from the group No. 10 to the group No. 34, are tabulated in TABLE 4.

TABLE 4

| pattern group | Number of Data Patterns amount of accumulated charge | | | | |
|---|---|---|---|---|---|
| | −4 | −2 | 0 | 2 | 4 |
| No. 10 | 2 | 0 | 0 | 0 | 2 |
| No. 11 | 0 | 0 | 0 | 0 | 2 |
| No. 12 | 0 | 0 | 0 | 0 | 2 |
| No. 13 | 0 | 0 | 0 | 0 | 1 |
| No. 14 | 0 | 4 | 0 | 4 | 0 |
| No. 15 | 4 | 4 | 0 | 4 | 4 |
| No. 16 | 2 | 0 | 0 | 0 | 2 |
| No. 17 | 0 | 2 | 0 | 0 | 0 |
| No. 19 | 0 | 0 | 8 | 0 | 0 |
| No. 20 | 0 | 4 | 16 | 4 | 0 |
| No. 21 | 4 | 0 | 8 | 0 | 4 |
| No. 22 | 2 | 4 | 0 | 4 | 2 |

TABLE 4-continued

| pattern group | Number of Data Patterns amount of accumulated charge | | | | |
|---|---|---|---|---|---|
| | −4 | −2 | 0 | 2 | 4 |
| No. 23 | 0 | 2 | 12 | 0 | 0 |
| No. 24 | 2 | 4 | 0 | 4 | 2 |
| No. 25 | 1 | 0 | 8 | 0 | 1 |
| No. 26 | 0 | 4 | 8 | 4 | 0 |
| No. 27 | 0 | 2 | 0 | 6 | 6 |
| No. 28 | 0 | 0 | 12 | 6 | 3 |
| No. 29 | 0 | 0 | 2 | 0 | 0 |
| No. 30 | 0 | 0 | 6 | 6 | 12 |
| No. 31 | 0 | 0 | 0 | 6 | 8 |
| No. 32 | 0 | 3 | 0 | 3 | 0 |
| No. 33 | 0 | 0 | 0 | 0 | 1 |
| No. 34 | 0 | 3 | 18 | 3 | 0 |

Since this TABLE 4 was made with the similar manner to TABLE 3, its detailed explanation will be omitted. However, note that the numbers of data patterns for zero accumulated charge are two times those numbers tabulated in TABLE 3, and that only those numbers of data patterns for −4 through 4 are tabulated. About the above first point, its detailed reason will be given later, while about the above second point, it is because of posing a limitation of including only those having absolute values of accumulated charge not exceeding 4. The reason for this posed limitation is that the number of those patterns is more than 256 ($2^8$) even after this limitation. Also, since, in the pattern group No. 18, there is no data pattern whose absolute value of accumulated charge does not exceed 4, it is omitted from TABLE 4.

Hereupon, some explanations are necessary for those data patterns having zero accumulated charge. They always keep their zero even after taking any possible permutations in their combination of intervals of the inversion and hence always fulfill Eq. (101), then it is clear that they also fulfill Condition 3.

Figure 3:
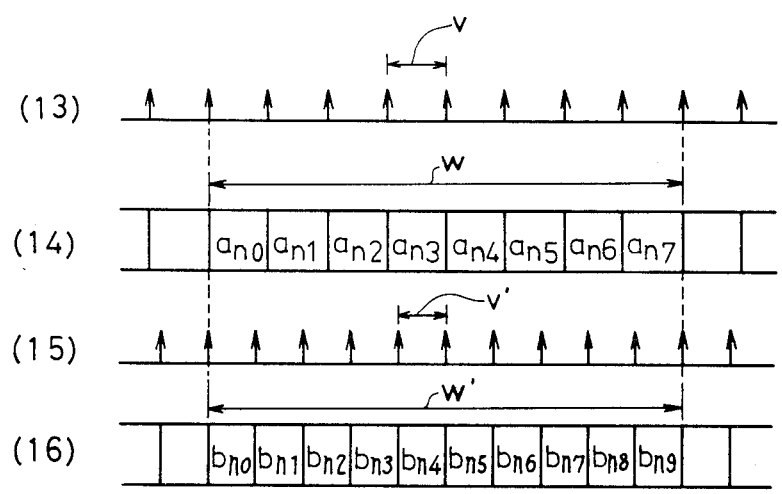
FIG. 3 is a timing chart showing a conventional example of the block-coding.

In FIG. 3, all the data patterns are assumed as starting with the high level. Therefore, if those patterns starting with the low level are included, the numbers of data patterns become twice as of those in FIG. 3. It is natural that those data patterns starting with the low level have the same absolute values and reversed signals of amount of accumulated charge of corresponding data patterns starting with the high level. Therefore, in those data patterns with zero amount of accumulated charge, the amount of accumulated charge is always zero regardless of their starting level. Hereinafter, for simplification of the explanation, corresponding to data patterns tabulated in TABLE 2, those data patterns starting with the low level are now defined as "inverted data patterns".

In TABLE 3, corresponding to data patterns with zero amount of accumulated charge, their corresponding inverted data patterns also have zero amount of accumulated charge. Also, in these inverted data patterns, their intervals of the inversion never exceed a range of 3 to 9. Therefore, these inverted data patterns are also usable. As the result of the fact described above, the numbers of data patterns whose amounts of accumulated charge are zero in TABLE 4 are taken to be twice the corresponding numbers of data patterns in TABLE 3.

Figure 5:
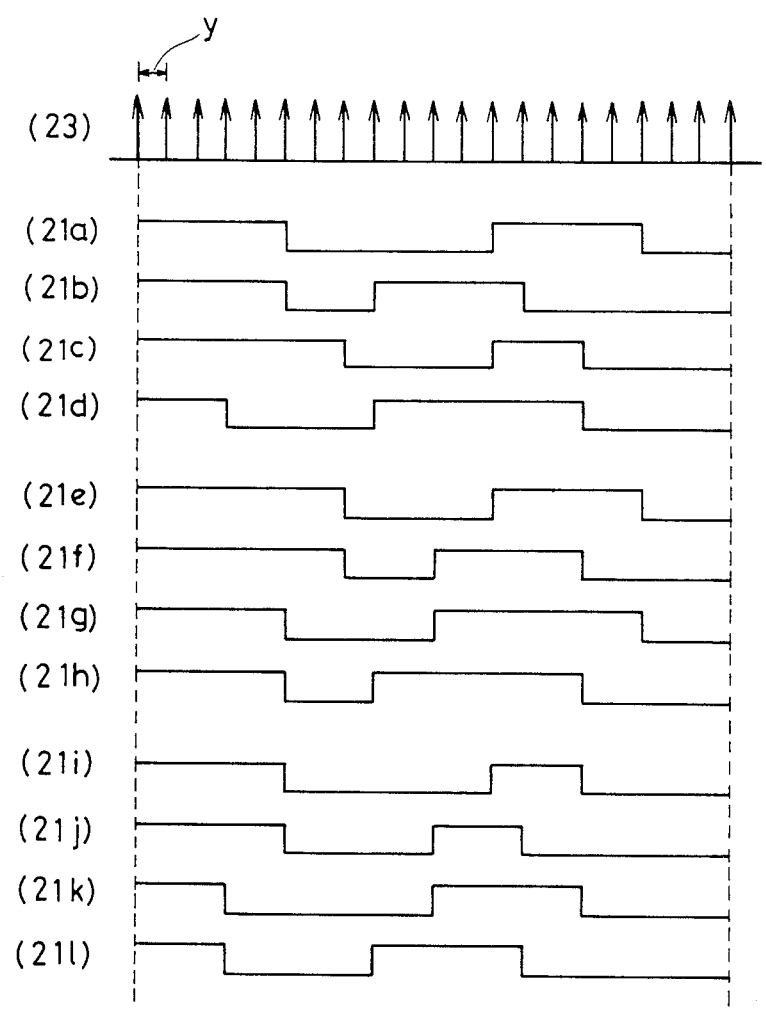

Next, about the treatment of those data patterns whose amount of accumulated charge is non-zero, explanation is given with using waveforms shown in FIG. 5. Waveforms in FIG. 5 show 12 different data patterns included in the data pattern group No. 21 in TABLE 2.

In FIG. 5, (23) is a clock signal of the output data sequence, y indicates bit-cell length, (21a) to (21l) show waveforms of twelve different data patterns belonging to the data pattern group No. 21. Since FIG. 5 is represented in a similar manner as FIG. 4, any detailed explanation will not be given here, but the main point is that these data patterns (21a) to (21l) are all limited to those data patterns which are constructed with a combination of element pattern having intervals of the inversion of 3, 5, 5, and 7. That is, for those data patterns including one of the intervals of the inversion of 3, two of 5, and one of 7, only 12 different patterns can exist, and they are those represented as (21a) to (21l) in FIG. 5. Then the accumulated charges of these 12 different patterns were integrated. Integrated results are as follows: zero for data patterns (21a) to (21d), +4 for data patterns (21e) to (21h), and −4 for data patterns (21i) to (21l). These results are naturally coincide with the content of the pattern group 21 of TABLE 3.

Hereupon, among said data patterns, four data patterns whose accumulated charges are zero, that is, data patterns, 21a, 21b, 21c, and 21d, have no problem for constructing the binary balanced code.

Next, about those data patterns whose accumulated charges are non-zero, that is, data patterns 21e to 21l, it is clear that their direct use does not satisfy Eq. (101). However absolute values of the accumulated charges of these data patterns are not larger than 4. (Hereupon, not only for the pattern group No. 21, but also for all the other pattern groups in TABLE 4, numbers of only those data patterns whose absolute values of accumulated charges are not larger than 4 are tabulated.) It is clear that, also in the inverted data patterns of those data patterns with non-zero accumulated charges, the absolute values of their accumulated charge do not exceed 4.

Figure 6:
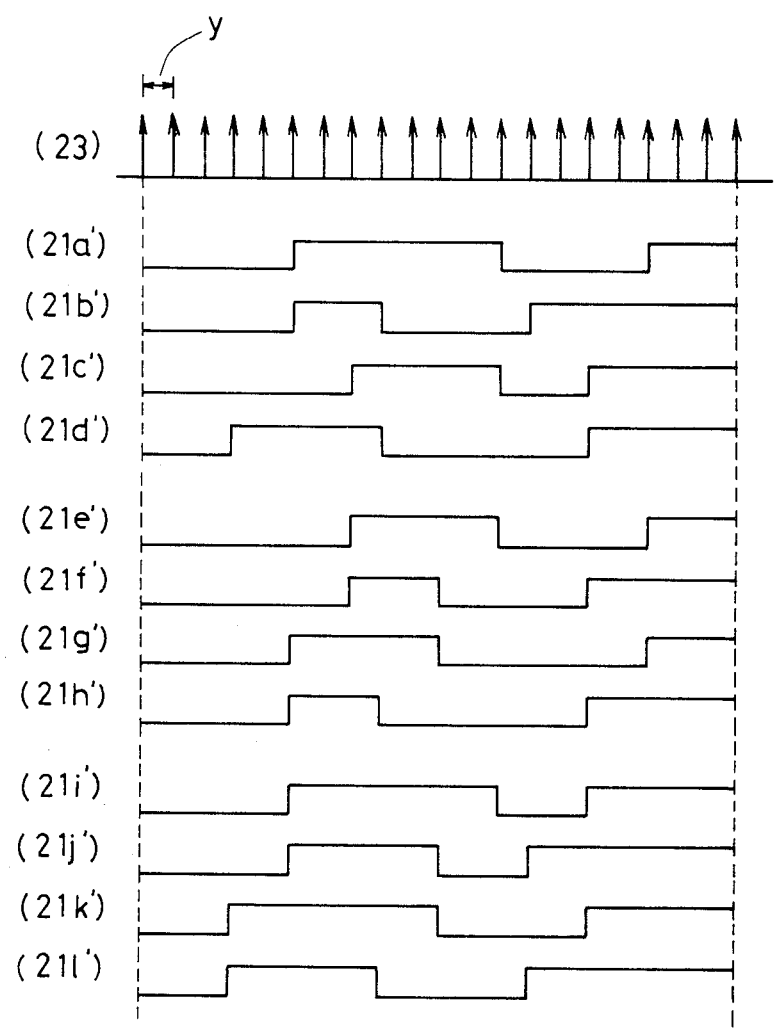

The inverted data patterns of the data pattern group No. 21 are shown in FIG. 6. In FIG. 6, (23) is a clock signal, y is a bit-cell length, and they correspond to (23) and y in FIG. 5, respectively. Data patterns (21a') to (21l') are inverted data patterns of the data patterns (21a) to (21l) of FIG. 5, respectively. Integration of the accumulated charges of these data patterns (21a') to (21l') reveals that they are zero for the data patterns (21a') to (21d'), −4 for the data patterns (21e') to (21h'), and +4 for the data patterns (21i') to (21l'). That is, these accumulated charges of the data patterns (21a') to (21l') are the same in their absolute values and reversed in their signs to those of their corresponding data patterns (21a) to (21l) of FIG. 5.

Referring to the data patterns having non-zero accumulated charge, it is possible to keep an integrated value of their accumulated charge within a finite value by means of suitable use of either original or inverted data patterns. In this respect, further explanation is given below. Now, if the data patterns (21a) to (21d) or (21a') to (21d') are assumed to be in use, the integrated value of the accumulated charges become zero at the end of each data pattern. Thereafter, however, a data pattern whose accumulated charge is non-zero, such as the data pattern (21e), is assumed to be used, the integrated value of accumulated charge becomes +4. Furthermore, thereafter, if it happens that the data pattern (21e) must be followed by (21h), the resultant integrated value of accumulated charge increases still more. As described above, in case that the integrated value of the accumulated charge becomes non-zero, then it becomes necessary to use such the data patterns that further increases the absolute value of the integrated value of accumulated charge, Eq. (101) is no more satisfied and the possibility that the sequence of data patterns becomes no longer binary balanced code is very large. At that time, however, if the inverted data pattern of the data pattern in place thereof is employed, the absolute value of the integrated value of the accumulated charge can be kept within a predetermined value.

That is, even in the case of those data patterns whose accumulated charges are non-zero, by using them with their inverted data patterns, it becomes possible to satisfy Eq. (101). Taking the data pattern group No. 21 as an example, eight data patterns, that is, data patterns (21a) to (21d), whose accumulated charges are zero and their respective reversed data patterns (21a') to (21d'), can be employed without any restriction; meanwhile, also for data patterns (21e) to (21l) whose accumulated charges are non-zero, by using them with their inverted data patterns (21e') to (21l'), it becomes possible that their integrated value of the accumulated charge are finite and their data pattern sequence is the binary balanced code. Therefore, in the data patterns group No. 21, 16 different data patterns in total can be employed (8 different data patterns with non-zero accumulated charge and 8 different data patterns with zero accumulated charge). Then, the similar procedure was applied to all the other data pattern groups No. 10 through No. 34, and the results were already tabulated in TABLE 4. As is clear from the above explanation, the numbers of data patterns with zero accumulated charge in TABLE 4 are as twice large as those in TABLE 3.

The grand total of the numbers of data patterns tabulated in TABLE 4 becomes 257. Hereupon, since the explanation is being described for the case that the input data block is composed of 8 data bits, then as the output data patterns, 256 ($2^8$) different data patterns are necessary. Therefore, for those data patterns constituting TABLE 4, all input data patterns can be respectively allotted to output data pattern.

As is clear from the above explanation, by using those data patterns constituting TABLE 4, it becomes possible to realize the following coding scheme fulfilling all the following conditions at one time:

Condition 1. $T\max = 18$,
Condition 2. $T\min = 3$, } (Case 1)
Condition 3. binary balanced code which are already mentioned. Hereupon, the data patterns constituting TABLE 4 are also those data patterns fulfilling the condition that the absolute value of the accumulated charge is not larger than 4.

Therefore, if those conditions used above are changed, usable data patterns are also changed. Then next, the coding scheme fulfilling the following three conditions at one time is considered:

Condition 1'. $T\max = 14$,
Condition 2'. $T\min = 3$, } (Case 2)
Condition 3. binary balanced code, In this case also, in a similar way as in obtaining TABLE 4, first, for avoiding the possible violation of Condition 1', those data patterns whose intervals of the inversion are larger than 7 in TABLE 3 are eliminated. Referring to condition 2', all the data patterns constituting TABLE 3 fulfill this Condition 2'. Then in TABLE 3, only those data pattern groups below No. 18 are considered, and examining the accumulated charge about each of those above data patterns, only the data patterns having absolute values of the accumulated charge not over 6 are left from TABLE 3, and thus TABLE 5 is obtained.

TABLE 5

| data pattern group | Number of Data Pattern accumulated charge | | | | | | |
|---|---|---|---|---|---|---|---|
| | −6 | −4 | −2 | 0 | 2 | 4 | 6 |
| No. 18 | 0 | 0 | 0 | 0 | 0 | 0 | 2 |
| No. 19 | 0 | 0 | 0 | 8 | 0 | 0 | 0 |
| No. 20 | 4 | 0 | 4 | 16 | 4 | 0 | 4 |
| No. 21 | 0 | 4 | 0 | 8 | 0 | 4 | 0 |
| No. 22 | 0 | 2 | 4 | 0 | 4 | 2 | 0 |
| No. 23 | 0 | 0 | 2 | 12 | 0 | 0 | 6 |
| No. 24 | 0 | 2 | 4 | 0 | 4 | 2 | 0 |
| No. 25 | 0 | 1 | 0 | 8 | 0 | 1 | 0 |
| No. 26 | 0 | 0 | 4 | 8 | 4 | 0 | 0 |
| No. 27 | 0 | 0 | 2 | 0 | 6 | 6 | 0 |
| No. 28 | 0 | 0 | 0 | 12 | 6 | 3 | 12 |
| No. 29 | 0 | 0 | 0 | 2 | 0 | 0 | 0 |
| No. 30 | 0 | 0 | 0 | 6 | 6 | 12 | 6 |
| No. 31 | 0 | 0 | 0 | 0 | 6 | 8 | 6 |
| No. 32 | 0 | 0 | 3 | 0 | 3 | 0 | 0 |
| No. 33 | 0 | 0 | 0 | 0 | 0 | 1 | 0 |
| No. 34 | 0 | 0 | 3 | 18 | 3 | 0 | 0 |

Since TABLE 5 was made in a similar way as in TABLE 4, detailed explanation is omitted here. In FIG. 5, the reason why the numbers of data patterns for those data patterns, whose accumulated charge is zero, are as twice large as the corresponding numbers in TABLE 3 is the same for the case of TABLE 4. The grand total of the number of data patterns of TABLE 5 is 258, and this is an enough number which can cover the total number of input data patterns, 256 ($2^8$). Hereupon, for all those data patterns in FIG. 5, it is necessary to examine whether each of them becomes a binary balanced code or not. But on this point, in a similar way as in TABLE 4, they can be recognized to be a binary balanced code, and therefore, the explanation on it is also omitted here.

2. Example

Figure 7:
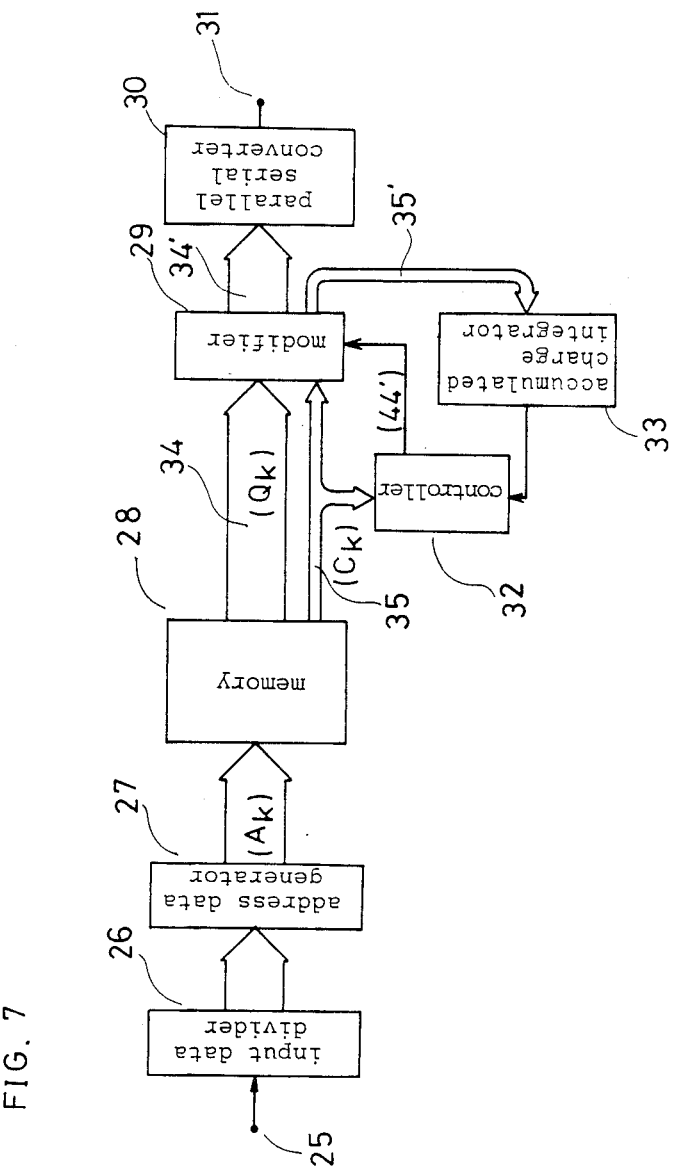
FIG. 7 is a block diagram showing an embodiment of the present invention.

An embodiment of apparatus of the present invention is shown with a block diagram in FIG. 7.

In FIG. 7, 25 is a data input terminal, 26 is an input data divider, 27 is an address signal generator, 28 is a memory, 29 is a modifier, 30 is a parallel-serial converter, 33 is an accumulated charge integrator, 32 is a controller, 35 and 34 are respectively accumulated charge data and the converted data sent from the memory 28. Numeral 35' and 34' are respectively accumulated charge data and converted data generated by the modifier 29, and 31 is a data output terminal. The data sequence to be converted is supplied to the input data divider 26 through the data input terminal 25, thereby it is divided into blocks at every prescribed data bits. Data divided into blocks become address signals for the memory 28 through the address signal generator 27, and it determines the read-out address of the memory 28. Those data recorded at the address accessed by the above address signal are read out as parallel data from the memory 28. These data contain both the accumulated charge data 35 and the converted data 34. The accumulated charge data 35 and the converted data 34 are sent to the modifier 29, and at the same time, the accumulated charge data 35 is also transmitted to the controller 32. The modifier 29 modifies both of the accumulated charge data 35 and the converted data 34 at the same time or does not modify them under the control of the instruction generated by the controller 32. In the data from the modifier 29, the accumulated charge data 35' is applied to the accumulated charge integrator 33, and the converted data 34' is transmitted to the parallel-serial converter 30, respectively.

At the accumulated charge integrator 33, by integrating successively the accumulated charge data 35', an integrated value up to the present time on the accumulated charges is calculated. The output of this charge integrator 33 and the accumulated charge data 35 transmitted from the memory 28 are applied to the controller 32, which performs a prescribed logical operation and logically decides whether the output data from the memory 28 is to be inverted or not to be inverted through the modifier 29 then controls the modifier 29 in dependence on the decided output. The converted data 34' is converted into corresponding serial data through the parallel-serial converter 30 and sent out through the output terminal 31. Hereupon "converted data" represents those data of the output data block corresponding to the data of the input data block, and "accumulated charge data" represents the data indicating the value corresponding to the accumulated charge in each block of said converted data.

In more terse description, first the input data sequence is divided into data blocks through the input data divider 26, then responding to the data pattern of the input data block, the converted data 34 which corresponds to the output data and the accumulated charge data 35 which correspond to the amounts of the accumulated charge are respectively read out from the memory 28. The converted data 34' after receiving the inversion process under the control of the decided output from the controller 32 are sent out through the parallel-serial converter 30 as the output data sequence, and on the other hand, the accumulated charge data 35' are integrated and whether the absolute integrated value should be further increased or not depending at the occurrence of the subsequent converted data 34 is logically decided by the controller 32. In more practical description, when the data pattern, whose accumulated charge is non-zero, is to be used, it is necessary to decide whether the ordinary data pattern is to be used or alternatively its corresponding inverted data pattern is to be used.

Each part of FIG. 7 is explained in more detail below. Data patterns shown in TABLE 4 or TABLE 5 are assumed to be used. Naturally, the required number of data patterns which must be stored in the memory 28 is 256, and only a part of them is shown in TABLE 6.

TABLE 6

Address Data, Converted Data and Accumulated Charge Data for K-th Block of Input Data

| Address data $A_K$ | Output data of memory 28 $M_K$ | | data pattern $P_K$ |
|---|---|---|---|
| | converted data $Q_K$ | accumulated charge data $C_K$ | |
| 00000000 | 1111100000001111110000000 | | 21a |
| 00000001 | 1111100011111100000000000 | | 21b |
| 00000010 | 1111111000001111000000000 | | 21c |
| 00000011 | 1110000011111111000000000 | | 21d |
| 00000100 | 1111111000000111110000100 | | 21e |
| 00000101 | 1111111000111111000000100 | | 21f |
| 00000110 | 1111100000111111110000100 | | 21g |
| 00000111 | 1111100011111111000000100 | | 21h |
| 00001000 | 1111100000001111000001100 | | 21i |
| 00001001 | 1111100000111100000001100 | | 21j |

In TABLE 6, $A_K$, $M_K$, $Q_K$, $C_K$, and $P_K$ represent the address data, the output data of the memory 28, the converted data, the accumulated charge data, and the data pattern, respectively where the subscript K represents that a data pattern of the input data block is K. For the sake of simplicity of the explanation, only ten data patterns of the waveforms (21a) to (21j) are selected out of those waveforms shown in FIG. 5 and they are shown in TABLE 6. (It is needless to mention that still 246 data patterns other than the above ten are also necessary to be stored in the memory 28). Among the input data patterns which are already divided into blocks, ten data patterns having respectively those ten data patterns listed in the column of $A_K$ in TABLE 6, that is, 00000000, 00000001, - - -, 00001001 are to be converted respectively into data patterns 21a to 21j. Also the absolute values of the accumulated charges and their signs of said data patterns are stored in the memory 28 with binary four bits as shown in the column of $C_K$ in TABLE 6. Hereupon, the data block patterns, which are obtained after dividing the input data sequence into blocks, are assumed to vary in a random sequence of those data patterns shown in TABLE 6, for example, such as 21a→21d→21i→21j→21e→21f→21g→21h→21f→ - - - . This data pattern sequence and the behaviors of the accumulated charges and their integrated values associated with this data pattern sequence are shown in TABLE 7.

TABLE 7

Accumulated Charge Cn and Integrated Value Thereof $\Sigma_n C_n$ for Various (n-th) Data Blocks (for various data patterns Pn and P'n)

| | n | 1 | 2 | 3 | 4 | 5 | 6 | 7 | 8 | 9 |
|---|---|---|---|---|---|---|---|---|---|---|
| without inversion | Pn | 21a | 21d | 21i | 21j | 21e | 21f | 21g | 21h | 21f |
| | Cn | 0 | 0 | −4 | −4 | 4 | 4 | 4 | 4 | 4 |
| | $\Sigma_n C_n$ | 0 | 0 | −4 | −8 | −4 | 0 | 4 | 8 | 12 |
| with inversion | P'n | 21a | 21d | 21i | 21j' | 21e | 21f' | 21g | 21h' | 21f |
| | presence of inversion | no | no | no | yes | no | yes | no | yes | no |
| | C'n | 0 | 0 | −4 | 4 | 4 | −4 | 4 | −4 | 4 |
| | $\Sigma_n C'n$ | 0 | 0 | −4 | 0 | 4 | 0 | 4 | 0 | 4 |

In TABLE 7, Cn represents the accumulated charge of each conversion data, $$\sum_n C_n$$

represents the integrated value of the accumulated charges, Pn represents the data pattern of each data block. The term "without inversion" represents the case of without any use of the inverted data patterns, and "with inversion" represents the case that the binary balanced code are realized with the use of the inverted data patterns. Also, P'n represents the data patterns including the inverted data patterns, "presence of inversion" represents whether the data patterns were inverted or not for realizing the binary balanced code, that is, it represents whether the inverted data pattern is used in place of ordinary pattern or not, and C'n and $$\sum_n C'n$$

represent the accumulated charge determined depending on P'n and the integrated value of those accumulated charges, respectively. Hereupon, the subscript n represents n-th data block in the sequence of blocks.

For the purpose of comparison, the case of "without inversion" was also included in TABLE 7. First, the case of "without inversion" is considered. When the data patterns transit from 21a to 21f, the integrated value of the accumulated charges varies as $0 \to 0 \to -4 \to -8 \to -4 \to 0 \to 4 \to 8 \to 12$. That is, it may happen that the integrated value become not satisfying Eq. (101).

Then, as has been explained in the Explanation of the principle of the present invention, the case of employing the inverted data patterns is considered. This case corresponds to the case of "with inversion" in TABLE 7. In this example of TABLE 7, up to the data pattern 21d started from 21a, that is up to n=2, the integrated value of the accumulated charges, $$\sum_n C'n,$$

keeps zero, and hence there is no need to use the inverted data pattern. However, in the next, at n=3, the data pattern varies to 21i. At this time, since the integrated value of the accumulated charge $$\sum_n C'n$$

up to this time is zero, the data pattern 21i is not inverted yet. As the result of this, the integrated value of the accumulated charge, $$\sum_n C'n,$$

becomes −4 at the end of data pattern 21i. Then at the next data block, n=4, if it is in the case of "without inversion", the data pattern is 21j, of which accumulated charge is −4, and the integrated value of the accumulated charges, $$\sum_n C'n,$$

at the end of data pattern 21i is −4 as stated above. Then if the data pattern 21j is used without any modification, the absolute value of the integrated value of the accumulated charges $$\sum_n C'n$$

increases further. This situation violates Eq. (101) and the sequence of data patterns cannot keep it as the binary balanced code any longer. Then, as in the above example, when $$\sum_{n=1}^{n-1} C'n$$

is non-zero, if the following data pattern Pn has a Cn of the same sign as $$\sum_{n=1}^{n-1} C'n,$$

the use of the inverted data pattern can prevent the above violation, and hence Eq. (101) is satisfied. That is, in case that $$\left(\sum_{n=1}^{n-1} C'n\right) \times Cn > 0, \tag{105}$$

the inverted data pattern having an accumulated charge C'n is used instead of the ordinary data pattern. Since the absolute values of Cn and C'n are not larger than 4, by applying the operation described above, the absolute value of $$\sum_n C'n$$

never exceeds 4.

In this manner the data pattern 21j is inverted into its inverted data pattern 21j'. After this inversion, C'n becomes +4 and hence $$\sum_n C'n$$

at the end of the data pattern 21j' becomes zero. Next, at n=5, the data pattern 21e follows. At this time, since $$\sum_{n=1}^{n-1} C'n$$

is zero at a time point just before the beginning of the data pattern 21e as mentioned above, it is not necessary to invert the data pattern 21e into its inverted data pattern. Since C'n of the data pattern 21e is +4, $$\sum_n C'n$$

at the end of this data pattern, 21e, becomes +4. For the following sequence of data blocks, by applying the same process repeatedly, $$\sum_i C'n$$

can be always held within a prescribed range of finite value 4.

Hereupon, the prime symbol ' attached to the alphabetic variables in TABLE 7 is used for the case wherein the data patterns may be changed to their corresponding inverted patterns depending on the necessity. Also, in the entry of "presence of inversion", "no" implies that there is no inversion and "yes" implies the presence of the inversion.

For further clarification, an elucidation is given on the correspondence between TABLE 7 and TABLE 6. In case of applying an input data, which varies the data patterns as a sequence $21a \rightarrow 21d \rightarrow 21i \rightarrow 21j \rightarrow 21e \rightarrow 21f \rightarrow 21g \rightarrow 21h \rightarrow 21f$, for example, that is the case that, an input data sequence to be converted is: 000000000000001100001000000100100000100 0000010100000110000001110000101 . . . , then, the inverted data patterns are used three times during the above data sequence. And accordingly, the resulted output data patterns become as $21a \rightarrow 21d \rightarrow 21i \rightarrow 21j' \rightarrow 21e \rightarrow 22f' \rightarrow 21g \rightarrow 21h' \rightarrow 21f$. In this case, a modified output data sequence becomes as 111110000000111100011000001111110000011111000- 0000011100000 000001111100011111111111110000011100000000011- 1000001111111 11100000111111100000000011100000001111111111100- 01111100000 . . . . Also in TABLE 6, for the sake of simplicity of the explanation, only ten different data patterns are shown, but actually 256 different data patterns are stored in the memory 28.

Figure 8:
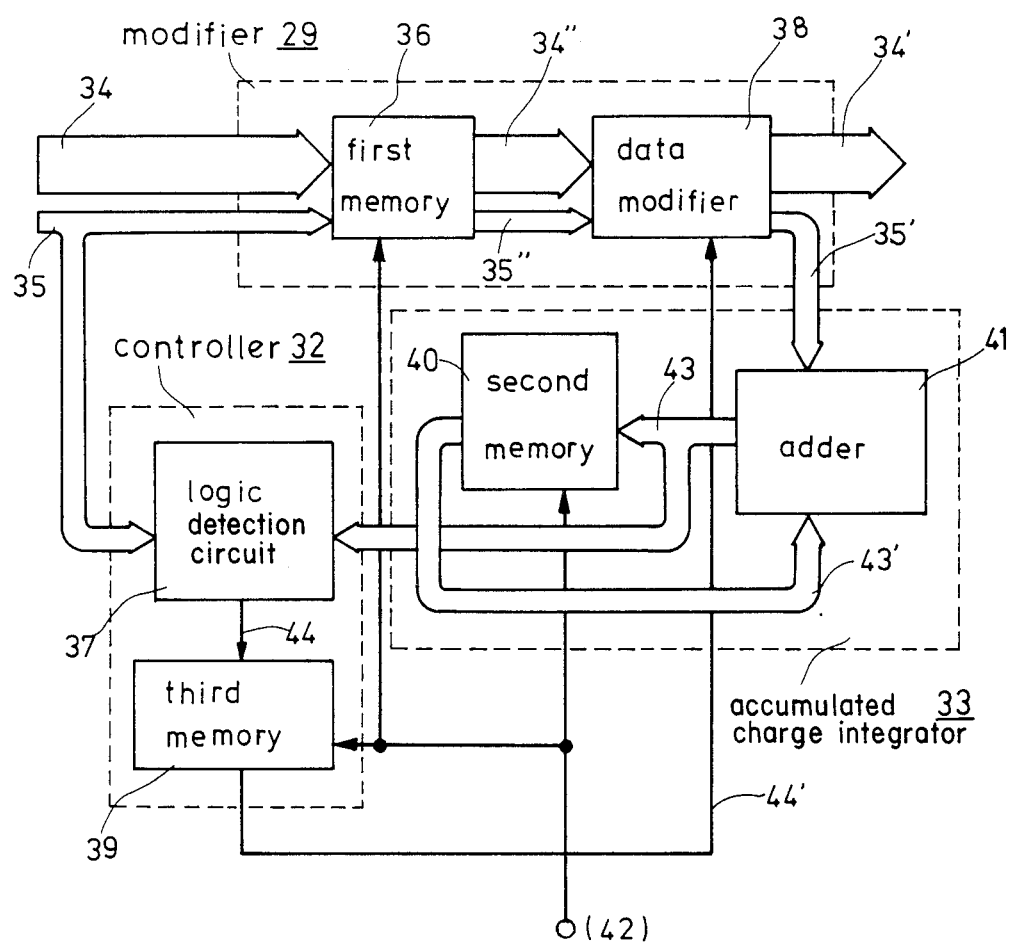
FIG. 8 is a block diagram of a structural example of a converter, an accumulated charge integrator, and a conversion controller in FIG. 7.

Next, a structural example of the accumulated charge integrator 33, the modifier 29, and the controller 32 is shown by a block diagram in FIG. 8. In FIG. 8, 36 is a first memory, 39 is a third memory, 40 is a second memory, 38 is a data modifier, 41 is an adder, 37 is a logic detection circuit, 29, 32, 33, 34, 34', 35, and 35' correspond respectively to the modifier 29, the controller 32, the accumulated charge integrator 33, the converted data 34, 34', and the accumulated charge data 35, 35', respectively in FIG. 7. Numerals 34" and 35" are the converted data and the accumulated charge data, respectively, produced by the first memory 36. Also, 43, 43', 44, and 44' represent output data from the adder 41, the second memory 40, the logic detection circuit 37, and the third memory 39, respectively, and they correspond respectively to signals 43, 43', 44 and 44' in FIG. 9 which will be used for the later explanation.

In the data produced by the memory 28, the accumulated charge data 35 are fed to the first memory 36 as well as to the logic detection circuit 37, and the converted data 34 are fed to the first memory 36, respectively. The converted data 34" sent out from the first memory 36 becomes the converted data 34' through the data modifier 38 and are fed to the parallel-serial converter 30. On the other hand, the accumulated charge data 35" is sent out from the first memory 36 become the accumulated charge data 35' by processed through the data modifier 38 and are fed to the adder 41. Hereupon, the first memory 36, the third memory 39, and the second memory 40 are for holding data at prescribed timings for predetermined time intervals, and they can be constructed with such as latches. Therefore, now assuming the accumulated charge data 35 sent out from the memory 28 is an n-th accumulated charge data Cn, the accumulated charge data 35" at this time point is Cn—-1, and the accumulated charge data 35' is C'n—1, respectively. Meanwhile, in the adder 41 the accumulated charge data 35' and the output data 43' of the second memory 40 are added and its result is applied back to the second memory 40. Therefore, at the time point when the accumulated charge data 35 is Cn, in the adder 41, the output data 43' of the second memory 40, that is, the integrated value of the accumulated charges, $$\sum_{n=1}^{n-2} C'n,$$

and the output data of the data modifier 38, that is, the accumulated charge data, C'n−1, are added and a new integrated value of the accumulated charges, $$\sum_{n=1}^{n-1} Cn \left( = \sum_{n=2}^{n-2} C'n + C'n - 1 \right),$$

is sent out as new output data 43. This new output data 43 is again applied to the second memory 40 and also to the logic detection circuit 37 in the controller 32. In the logic detector 37, a prescribed logical operation is performed for the accumulated charge data 35 input from the memory 28 and the output data 43 of the adder 41. That is, in this logic detection circuit 37, depending on a relation between the accumulated charge data Cn and the integrated value of the accumulated charges $$\sum_{n=1}^{n-1} C'n,$$

a decision is made whether the original data as the converted data 34 should be used or its corresponding inverted data in place of the above data should be used, and thereby a control signal In is produced. This control signal In is sent as the output data 44 of the logic detection circuit 37 and is fed to the third memory 39. Naturally, the output 44' of this third memory 39 at this time point is the preceding control signal In−1 and this control signal In−1 controls the data modifier 38. At this time point, since the data being processed in the data modifier 38, that is, the converted data 34" and the accumulated charge 35" are respectively those corresponding to the data pattern to be used at the (n−1)th time point, then this (n−1)th control signal can decide whether the data patterns at this (n−1)th time point should be inverted or not.

Hereupon, the logical operations in the logic detection circuit 37 are such that it gives the high level signal when the following two logical conditions, "Logical Condition 1."

$$\begin{cases} \text{Output data 43 of the adder 41, i.e., the integrated value} \\ \text{of the accumulated charges } \sum_{n=1}^{n-1} C'n, \text{ is non-zero, and} \end{cases}$$

"Logical Condition 2."

$$\begin{cases} \text{Output data 43 of the adder 41 and the accumulated} \\ \text{charge data 35 are of the same sign, that is,} \\ \sum_{n=1}^{n-1} C'n \text{ and } Cn \text{ are in the same sign,} \end{cases}$$

are fulfilled, and it gives the low level signal when the above logical conditions are not fulfilled. For this logic detection circuit 37, one of its structural examples is shown by a logic circuit diagram in FIG. 10 and further explanations will be given later.

For the data modifier 3 the explanation in more detail is given now. The controller 32 decides whether the data patterns should be used as they are, or in place at those data patterns, their corresponding inverted data patterns should be used, and produces the control signal 44′, while the data modifier 38 switches the above two states responding to the control signal 44′ produced by controller 32.

Next let us consider the converted data 34″. When the control signal 44′ is in the low level, the data pattern should not be inverted into the inverted data pattern, and hence the converted data 34″ is fed to the parallel-serial converter 30 of FIG. 7 as the converted data 34′ with maintaining the data state. On the contrary, when the modification control signal 44′ is in the high level, it is necessary to invert the data pattern into its corresponding inverted data pattern, and hence, for all the data contained in the converted data 34″, low levels are inverted into high levels and high levels are inverted into low levels, thereby the converted data 34′ is obtained as the inverted data pattern of the converted data 34″, and it is fed to the parallel-serial converter 30.

Also for the accumulated charge data 35″, when the control signal 44′ is in the low level, the inverted data pattern is not used, and hence, the accumulated charge data 35″ is fed to the adder 41 as the accumulated charge data 35′ with keep the data state intact. On the contrary, when the control signal 44′ is in the high level, the inverted data patterns are used, and hence the data, whose absolute value of the accumulated charge data is the same and sign is reversed, must be fed to the adder 41 as the accumulated charge data 35′.

Hereupon, in case that those data patterns shown in Table 5, (i.e. the Case 2) are used, the accumulated charges in each data pattern take only seven different values of −6, −4, −2, 0, 2, 4, and 6. Then these seven different accumulated charge values are stored in the memory 28 as shown in the column $C_K$ in table 6, and they are also listed here

| | |
|---|---|
| 1010 | for −6 |
| 1100 | for −4 |
| 1110 | for −2 |
| 0000 | for 0 |
| 0010 | for 2 |
| 0100 | for 4 |
| 0110 | for 6, | where negative values are expressed in the complementary expression of numeral 2. Therefore, when the control signal 44′ is in the high level, that is when the inverted data patterns must be used, the following four bit data, must be fed to the adder 41 as the accumulated charge data 35′:

| | |
|---|---|
| 0110 | for −6 of converted data 35″ |
| 0100 | for −4 of converted data 35″ |
| 0010 | for −2 of converted data 35″ |
| 0000 | for 0 of converted data 35″ |
| 1110 | for 2 of converted data 35″ |
| 1100 | for 4 of converted data 35″ |
| 1010 | for 6 of converted data 35″. |

In this manner, responding to the control signal 44′, the converted data 34′ and the accumulated charge data 35′ are produced from the converted data 34″ and the accumulated charge data 35″, respectively.

Figure 11:
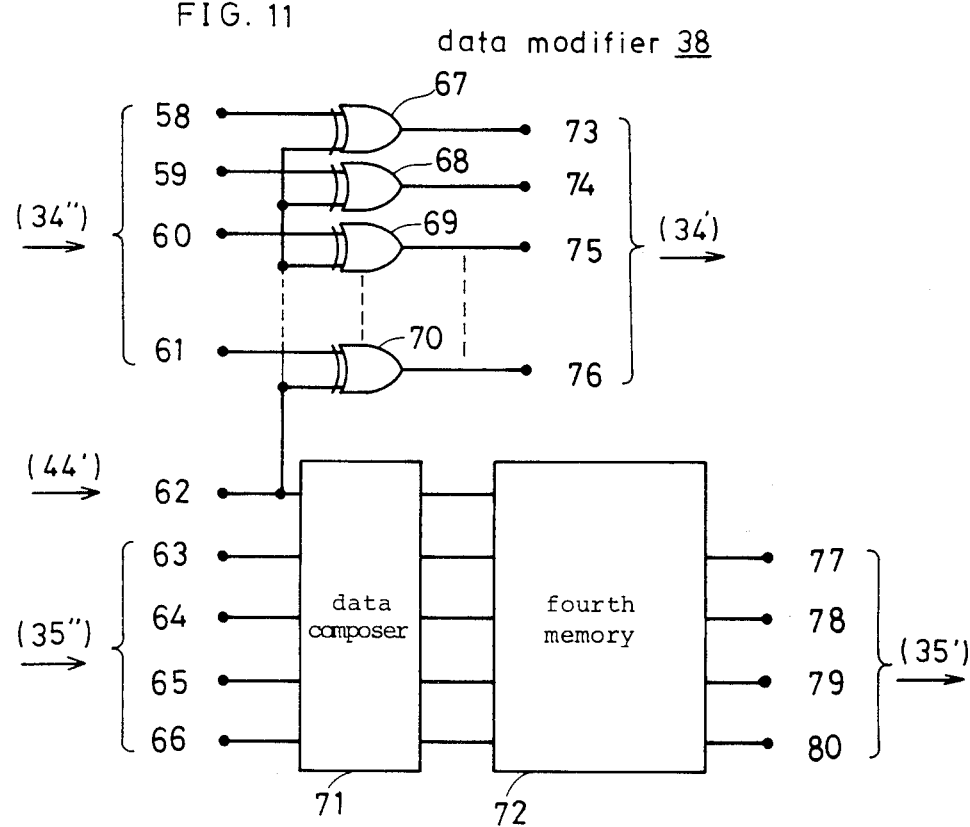
FIG. 11 is a circuit diagram showing a structural example of a data modifier in FIG. 8.

For the data modifier 38, an structural example is shown in FIG. 11, and the explanation will be given later.

Figure 9:
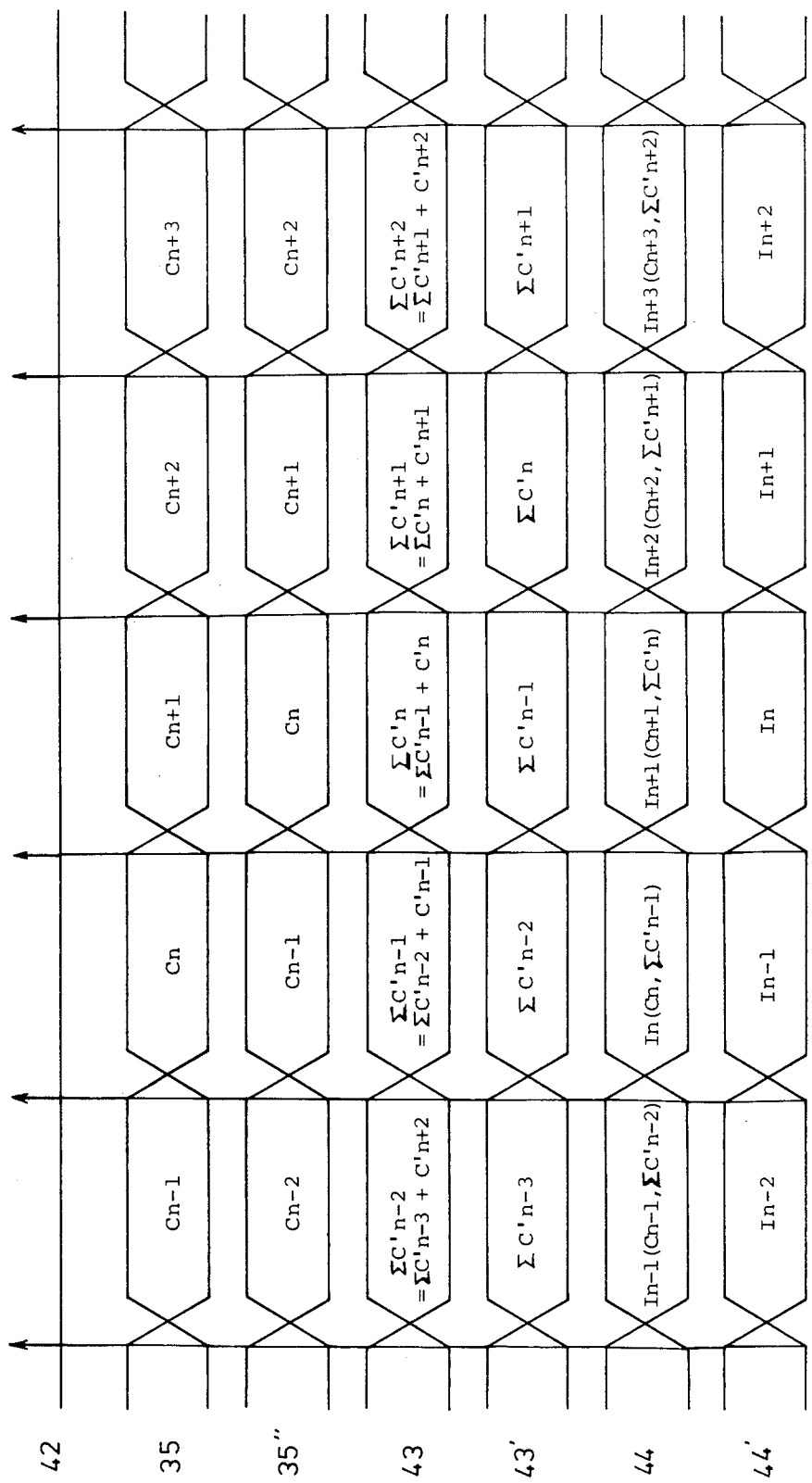
FIG. 9 is a data transition diagram showing states of data at various parts of FIG. 8.

Timings of various parts of FIG. 8 are shown in FIG. 9, wherein, numeral 42 designates timing of clock signal for starting times of the output data blocks, numeral 35 designates accumulated charge data 35 shown in FIGS. 7 and 8, numeral 35″ designates accumulated charge data from the first memory 36, numeral 43 designates output data from the adder 41, numeral 43′ designates output data from the second memory 40, numeral 44 designates output signal from the logic detection circuit 37, and numeral 44′ designates output signal from the third memory 39. One of output data from the memory 28 of FIG. 7, the accumulated charge data 35 is input into the first memory 36 of FIG. 8, and then the first memory 36 outputs the accumulated charge data 35″ in a time sequence as shown in FIG. 9.

A clock signal 42 is fed to the first memory 36, the third memory 39 and the second memory 40, and these memories 36, 39 and 40 memorize their input data at the time when a clock pulse of the clock signal 42 is applied thereto and hold until the next clock pulse of the clock signal 42 is input thereto. Therefore, naturally, the output signal of the input data divider 26 is in synchronism with the clock signal 42.

Now, let us consider for an example, for the accumulated charge data 35 at a time $t_n$ of FIG. 9 when an n-th data, namely Cn is output from the memory 28. The signal of the accumulated charge output Cn−1 from the first memory 36 is delayed by one period of the clock signal 42 from that of input accumulated charge data Cn thereto. The adder 41 adds the accumulated charge data 35′ namely C′n−1, which is given thereto from the data modifier 38, to the output data 43′ of the second memory 40, namely $$\sum_{n=1}^{n-2} C'n.$$

Therein C′n implies an output data of the data modifier 38, which corresponds to the input data Cn. If the data modifier 38 does not make the data inversion, the output data C′n is equal to the input data Cn. On the contrary, if the data modifier 38 makes the data inversion, the output data C′n is equal to the inverted input data Cn. Thus, by adding the data C′n−1 to $$\sum_{n=1}^{n-2} C'n,$$

the adder 41 produces the output signal 43, namely $$\sum_n C'n.$$

The output signal 43 is then applied to the second memory 40 and is delayed by one clock period therein, to be a signal 43. The logic detection circuit 37 compares data of a first input signal thereto, namely the accumulated charge data 35 from the memory 28 and the data of a second input signal thereto, namely the integrated value of accumulated charge data, and detects whether the aforementioned logic conditions 1 and 2 will be both satisfied, and as a result of the detection, it produces a decided output signal 44 corresponding to a decided data in to the third memory 39. The decided output signal 44 is delayed by the third memory 39 by one clock period to produce a control signal 44', which is applied to the data modifier 38 in the modifier 29. That is, the converted data signal 34'' from the first memory 36 is modified (inversed) or not modified by the data modifier 38 depending on the contents of the control signal 44' from the third memory 39. In other words, in the data modifier 38, the (n−1)th converted data 34'' and the accumulated charge data are controlled by the control signal In−1 (of FIG. 9), which is the control signal 44' of the (n−1)th block of the converted data.

Figure 10:
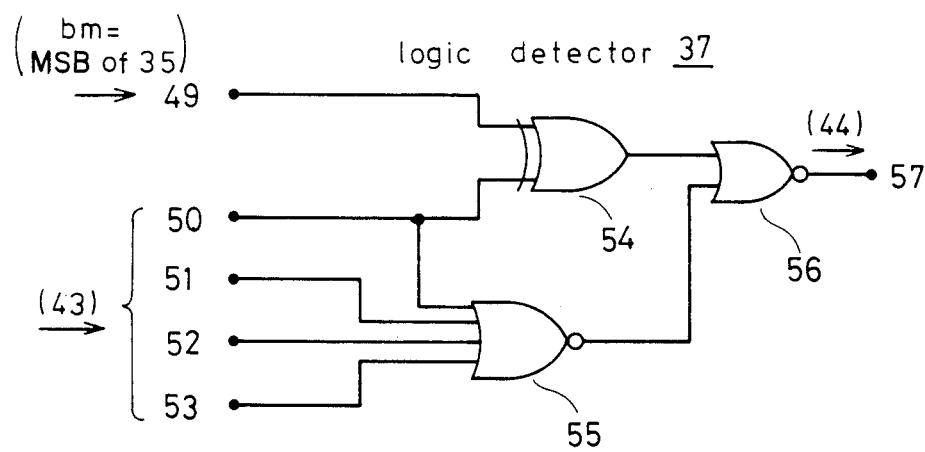
FIG. 10 is a logic circuit diagram showing a structural example of a logic detector in FIG. 8.

FIG. 10 shows an example of the logic detection circuit 37. In FIG. 10, numeral 54 designates an exclusive OR circuit and numerals 55 and 56 designates a first and a second NOR circuits, respectively, numerals 50 to 53 designate input terminals for signals representing integrated values of accumulated charges, numeral 49 designates accumulated charge input terminal and numeral 57 designates an output terminal of the logic detection circuit. Output signal 45 of the adder 41 is given to the input terminals 50 to 53. Now, let us assume that $a_3$, $a_2$, $a_1$ and $a_0$ are input data to the terminals 50 to 53, wherein the data $a_3$ is most significant bit (MSB). Also we assume that on the input terminal 49, the MSB data only of the accumulated charge data 35 of FIG. 8, is applied, which MSB data is named $b_m$. Then, for the output data X of the exclusive OR circuit 54, the following equation (106) holds:

$$X = a_3 \cdot \bar{b}_m + \bar{a}_3 \cdot b_m. \qquad (106)$$

On the other hand, for the output data Y of the NOR circuit 55, the following equation (107) holds:

$$Y = \overline{a_3 + a_2 + a_1 + a_0} \qquad (107)$$
$$= \bar{a}_3 \cdot \bar{a}_2 \cdot \bar{a}_1 \cdot \bar{a}_0.$$

And, for the output data Z of the NOR circuit 56, the following equation (108) holds:

$$Z = \overline{X + Y} = \bar{X} \cdot \bar{Y}. \qquad (108)$$

The $\bar{X}$ of Eq. (106) corresponds to the aforementioned "Logical Condition 2". The reason is that $a_3$ and $b_m$ are MSB of the data 43 and data 35, respectively, and at the same time are sign bits for these data 43 and 35, and indicate identity between the sign bits of integrated value of the accumulated charge 43 and the present accumulated charge 35. The $\bar{Y}$ of Eq. (107) corresponds to the abovementioned "Logical Condition 1", since when one or more "1" is included in $a_3$ to $a_0$, then the $\bar{Y}$ becomes "1". With this, decision is made whether the integrated amount of the accumulated charge is zero or non-zero. By applying the abovementioned natures of $\bar{X}$ and $\bar{Y}$ to the Eq. (108), it is observed that the output terminal 57 produces a control signal to control modification (such as inversion in this example) of the data in the data modifier 38.

One example of the data modifier 38 is shown in FIG. 11. In FIG. 11, numerals 58 to 61 represent twenty input terminals to receive converted data 34'' from the first memory 36, numerals 63 to 66 represent input terminals to receive accumulated charge data 35'' from the first memory 36. Numeral 67 to 70 designate twenty exclusive OR circuits having one input terminals 58 to 61 each. Numeral 62 designates an input terminal commonly connected to the other input terminals of the exclusive OR circuits 67 to 70 to receive the control signal 44' from the third memory 39. Numeral 71 is a data composer, consisting of, for example, a latching circuit and sends output to the fourth memory 72, which comprises output terminals 77 to 80 to output accumulated charge data 35'. Numerals 73 to 76 are twenty output terminals of the twenty exclusive OR circuits to output conversion data 34' of the modifier 29.

In this example, which utilizes 8–20 conversion, the converted data 34' are of course parallel 20 bits data. The parallel 20 bits data are input through the input terminals 58 to 61 to one input terminal each of the twenty exclusive OR circuits 67 to 70, respectively. Accordingly, when the control signal 44' applied to the input terminal 62, which is connected to the other input terminal each of the exclusive OR circuits 67 to 70, is of low level, the data received at the input terminals 58 to 61 are given as they are to the output terminals 73 to 76. On the contrary, when the control signal 44' applied to the input terminal 62 is of the high level, twenty inverted output data to the twenty input data received at the input terminals 58 to 61 are provided to the twenty output terminals 73 to 76. Thus, the converted data 34'' are modified (namely inverted) depending upon the control signal 44' applied on the input terminal 62, and produces modified converted data 34'.

Accumulated charge data 35'' are applied through the input terminals 63 to 66 to the data composer 71. In this example, which utilizes parallel 4-bit accumulated charge data 35, the input accumulated charge data 35'' are of course parallel 4-bit data. Since the control signal 44' is applied through the input terminal 62 on the data composer 71, a 5-bit address signal is composed in the data composer 71, and is given to the fourth memory 72, which produces parallel 4-bit data to its output terminals 77 to 80. This parallel 4-bit data constitute the accumulated charge data 35' which is applied to the adder 41 of FIG. 8. For the fourth memory 72, for example, a ROM (read only memory) is used.

TABLE 8 shows an example of data memorized in the fourth memory 72.

TABLE 8

| Address Signal and Read out Signal (Modified Data) | | | | |
|---|---|---|---|---|
| Address Signals | | | Read-out Signals (Modified data) | |
| Control signal 44' | accumulated charge data C in binary system | data C represented in decimal system | accumulated charge data C' in binary system | data C' represented in decimal system |
| 0 | 1010 | −6 | 1010 | −6 |
| 0 | 1100 | −4 | 1100 | −4 |
| 0 | 1110 | −2 | 1110 | −2 |
| 0 | 0000 | 0 | 0000 | 0 |
| 0 | 0010 | +2 | 0010 | +2 |
| 0 | 0100 | +4 | 0100 | +4 |
| 0 | 0110 | +6 | 0110 | +6 |
| 1 | 1010 | −6 | 0110 | +6 |
| 1 | 1100 | −4 | 0100 | +4 |
| 1 | 1110 | −2 | 0010 | +2 |
| 1 | 0000 | 0 | 0000 | 0 |
| 1 | 0010 | +2 | 1110 | −2 |
| 1 | 0100 | +4 | 1100 | −4 |

TABLE 8-continued

| Address Signal and Read out Signal (Modified Data) | | | | |
|---|---|---|---|---|
| Address Signals | | Read-out Signals (Modified data) | | |
| Control signal 44' | accumulated charge data C in binary system | data C represented in decimal system | accumulated charge data C' in binary system | data C' represented in decimal system |
| 1 | 0110 | +6 | 1010 | −6 |

In TABLE 8, "Address signals" are the address signals consisting of parallel 5-bit data to be applied through the terminals 62 to 66 to the fourth memory 72, and "Read-out signals" are the modified data obtained at the output terminals 77 to 80 by reading out the fourth memory 72 by using the "Address signals". The control signal 44' is the signal which is applied to the input terminal 62 from the controller 32. The table bears the accumulated charge data described both in binary system and decimal system for high level "1" and low level "0" of the control signal 44' to the input terminals 62. Thus by using the data modifier 38, the final converted data output signal 34' and the accumulated charge data 35' are obtained from the data 34" and 35", respectively.

The data pattern of the converted data should not be limited to that shown in the foregoing TABLEs 4 and 6.

Summarizing the feature of the present invention, the art is directed to a kind of block coding as has been mentioned, and it is characterized in that the maximum inversion interval and minimum inversion interval are suitably set and the data pattern of the converted data form a binary balanced code.

In the foregoing explanation, the following two examples have been elucidated:

(Case 1)
$$\begin{cases} T\max = 7.2 \ldots \left( = 18 \text{ bits} \times \frac{8 \text{ bits}}{20 \text{ bits}} \right), \\ T\min = 1.2 \ldots \left( = 3 \text{ bits} \times \frac{8 \text{ bits}}{20 \text{ bits}} \right), \\ \text{type of code: binary balanced code,} \\ \text{maximum value of integrated amount of the accumulated charge: 4,} \\ \text{minimum value of integrated amount of the accumulated charge: 4.} \end{cases}$$

(Case 2)
$$\begin{cases} T\max = 5.6 \ldots \left( 14 \text{ bits} \times \frac{8 \text{ bits}}{20 \text{ bits}} \right), \\ T\min = 1.2 \ldots \left( 3 \text{ bits} \times \frac{8 \text{ bits}}{20 \text{ bits}} \right), \\ \text{type of code: binary balanced code,} \\ \text{maximum value of integrated amount of the accumulated charge: 4,} \\ \text{minimum value of integrated amount of the accumulated charge: 4.} \end{cases}$$

In embodying the present invention other cases than the abovementioned two cases can be designed by selecting the conditions of:
(1) number of bits in the data block of the input data,
(2) number of bits in the data block of the output data,
(3) value of Tmax
(4) value of Tmin (5) maximum value of integrated amount of the accumulated charge
(6) minimum value of integrated amount of the accumulated charge.

In the foregoing example, in setting the number of bit for maximum accumulated charge data for the embodiment of FIG. 10 and TABLE 6, the number of bits is selected to be 4 with enough margin. However, in actual design of the system, the number of bits for the maximum accumulated charge data should preferably be selected as small as possible, and this can be made smaller by decreasing kind of accumulated charge data.

In the example of the controller 32 in FIG. 8, the design is that the modification (inversion) is always made when signs of integrated amount of the accumulated charge and the accumulated charge data of the next data block are the same and the integrated amount is of non-zero. Accordingly, when the conditions of case 1 (case of TABLE 4) is adopted, the integrated amount of the accumulated charge becomes 4 or lower; and when the conditions of case 2 (case of TABLE 5) is adopted, the integrated amount of the accumulated charge becomes 6 or lower.

In the structure shown in FIG. 7, the memory 28 is the ROM, wherein the memory 28 memorizes only the data which start with high level ("1") bit, and the inverted data are produced by processing the same data thereafter. However, instead of such system, the inverted data as such may be memorized in the ROM memory 28 so as to be read out directly.

The correspondence between the input address data and the output read-out data is shown in TABLE 6. However, TABLE 6 shows only an example which is simplified for easiness of elucidation; and in actual application the correspondence of the data patterns should be selected taking account of statistical property of the input data sequence and characteristics of the transmission line to make optimum combination.

The method of the present invention is applicable not only to the transmission line such as magnetic information recording system, but also applicable with great effect in band pass type transmission line.

The decoding of the information produced in accordance with the method and apparatus of the present invention is made by carrying out a quite opposite process to the abovementioned coding process. The opposite process is made by inverting the direction of the process illustrated referring to FIG. 7, by constructing an inverted apparatus wherein connections between the circuit elements of FIG. 7 are inverted.

The data modifier 38 can be constituted, instead of the data composer (such as latch circuit) 71 and the fourth memory 72, by combining logic circuits.

What is claimed is:

1. A method of coding an input binary data sequence signal into a binary balanced output code signal comprising the step of:
   dividing the input binary data sequence signal which has a predetermined bit-cell length into blocks of signals, each block of signals having an input data pattern, thereby forming a set of input data block signals;
   reading a data block signal and an accumulated charge data representing an integrated value of data over one data block from a ROM by addressing the memory data generating from said input binary data sequence signal for converting said input data block signals into corresponding output data block signals, each output data block signal having a minimum inversion interval which is longer than said predetermined bit-cell length, and a maximum inversion interval which is 7.2 or less times said bit-cell length;

integrating said accumulated charge data;

inverting data of said output data block signal to produce an inverted data block signal at least when the integrated accumulated charge is about to exceed a predetermined finite value and when integration of said accumulated charge data is not zero; and assembling the non-inverted and inverted data block signals into said binary balanced output code signal.

2. A method according to claim 1, wherein said minimum inversion interval is 1.2 times said predetermined bit-cell length.

3. A method according to claim 2, wherein said maximum inversion interval is 5.6 times said bit-cell length.

4. An apparatus for coding an input binary data sequence into a binary balanced output code comprising:

a data divider for dividing the input binary data sequence which has a predetermined bit-cell length into blocks, each block having an input data pattern, thereby forming a set of input data blocks;

an address data generator for generating address data corresponding to each of said input data blocks;

a ROM memory which is accessed by said address data for generating converted data and accumulated charge data representing an integrated value of data over one convered data block;

an accumulated charge integrator for integrating said accumulated charge data;

modifier means for modifying, in response to a control signal, said converted data at least when the integrated accumulated charge data is about to exceed a predetermined value and when said accumulated charge data is not zero for producing a data pattern having a minimum inversion interval which is longer than said bit-cell length and a maximum inversion interval which is shorter than 7.2 times said bit-cell length;

a controller for generating said control signal for controlling the operation of said modifier means, said control signal being produced at least when the integrated accumulated charge data is about to exceed a predetermined value and when said accumulated charge data is not zero; and a parallel to serial converter for converting modified data from said modifier means into serial output signals forming the binary balanced output code.

5. An apparatus in accordance with claim 4, wherein said modifier means comprises:

a first memory circuit for memorizing said converted data and said accumulated charge data for a predetermined time period; and a data modifier for inverting low levels and high levels of -aid converted data and inverting the polarity of said accumulated charge data, output data from said data modifier being fed to said parallel to serial converter and said accumulated charge integrator.

6. An apparatus in according with claim 5, wherein said data modifier comprises:

a data composer for composing address signals by receiving said accumulated charge data from said first memory circuit and a control signal from said controller;

a second memory circuit for generating modified accumulated charge data responding to said address signals from said data composer; and plural exclusive OR circuits, each of which receives said control signal at a first input thereof and said converted data from said first memory circuit at a second input thereof;

said second memory circuit being connected to said accumulated charge integrator, and said exclusive OR circuits having an output terminal coupled to said parallel to serial converter.

7. An apparatus in accordance with claim 4, wherein said accumulated charge integrator comprises:

an adder for adding an output of said data modifier with feedback data and providing an output to said controller, and a memory circuit for memorizing an adder output for a predetermined time, and generating said feedback data for coupling to said adder.

8. An apparatus in accordance with claim 4, wherein said controller comprises a logic detection circuit responsive to said accumulated charge data from said ROM memory and the output of said accumulated charge integrator for generating the control signal when the polariities thereof are the same and when said accumulated charge data is not zero.

9. An apparatus in accordance with claim 8, wherein said logic detection circuit comprises:

a first NOR circuit for producing a NOR signal among component bits of said accumulated charge data from said ROM memory;

an exclusive OR circuit for producing an exclusive OR signal between signal bits of output of said accumulated charge integrator and said accumulated charge data from said ROM memory; and a second NOR circuit for producing a NOR signal between the output signals of said exclusive OR circuit and said first NOR circuit, and for producing an output signal as the output signal of said logic detection circuit.

10. An apparatus for producing a binary information comprising:

a data divider for dividing input binary data sequence into blocks of a first data pattern;

an address data generator for generating an address signal in response to an output signal of said data divider;

a first memory which is accessed by said address signal for generating converted data and associated accumulated charge data;

a modifier for modifying said converted data and said accumulated charge data in a predetermined manner for producing a binary balanced data sequence;

an accumulated charge integrator for integrating said accumulated charge data;

a controller for producing a control signal for controlling the operation of said modifier, said control signal being produced in response to (a) an output signal of said accumulated charge integrator and (b) said accumulated charge data; and a parallel to serial converter which converts said converted data output from said modifier into serial output signals, wherein said modifier comprises:

a second memory for memorizing said converted data and said accumulated charge data for a predetermined time period; and a data modifier for (a) inverting low levels and high levels of said converted data and (b) inverting the sign of said accumulated charge data, output data from said data modifier being fed to said parallel to serial converter and said accumulated charge integrator;

said data modifier comprising:

a data composer for composiing address signals by receiving said accumulated charge data from said second memory and a control signal from said controller;

a third memory for generating modified accumulated charge data responding to said address signals from said data composer; and plural exclusive OR circuits, each of which receives said control signal at one terminal thereof and said converted data from said first memory at the other terminal thereof;

said third memory being connected to said accumulated charge integrator, and said exclusive OR circuits being connected by its output terminal to said parallel to serial converter.

* * * * *